United States Patent
Castellanos Zamora et al.

(10) Patent No.: US 12,520,137 B2
(45) Date of Patent: Jan. 6, 2026

(54) AUTHENTICATION OF A WIRELESS DEVICE IN A WIRELESS COMMUNICATION NETWORK

(71) Applicant: Telefonaktiebolaget LM Ericsson (publ), Stockholm (SE)

(72) Inventors: David Castellanos Zamora, Madrid (ES); Jesus Angel De Gregorio Rodriguez, Madrid (ES); Emiliano Merino Vazquez, Madrid (ES); Cristina Ruiz Balmaseda, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 18/018,631

(22) PCT Filed: Jul. 29, 2021

(86) PCT No.: PCT/EP2021/071320
§ 371 (c)(1),
(2) Date: Jan. 30, 2023

(87) PCT Pub. No.: WO2022/023491
PCT Pub. Date: Feb. 3, 2022

(65) Prior Publication Data
US 2023/0308871 A1    Sep. 28, 2023

(30) Foreign Application Priority Data
Jul. 31, 2020   (EP) .................................... 20382715

(51) Int. Cl.
*H04W 12/06*   (2021.01)
*H04W 12/084*  (2021.01)

(52) U.S. Cl.
CPC ......... *H04W 12/06* (2013.01); *H04W 12/084* (2021.01)

(58) Field of Classification Search
CPC ... H04W 12/06; H04W 12/084; H04W 12/12; H04L 63/14; H04L 63/0807
See application file for complete search history.

(56) References Cited

U.S. PATENT DOCUMENTS

| | | | |
|---|---|---|---|
| 6,539,482 B1 * | 3/2003 | Blanco .................... | H04L 63/08 726/19 |
| 7,275,158 B2 * | 9/2007 | Akama .................. | G06Q 20/12 380/278 |

(Continued)

FOREIGN PATENT DOCUMENTS

| | | |
|---|---|---|
| CN | 110035433 A | 7/2019 |
| EP | 3737133 A1 | 11/2020 |

(Continued)

OTHER PUBLICATIONS

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

(Continued)

*Primary Examiner* — Michael Won
(74) *Attorney, Agent, or Firm* — Murphy, Bilak & Homiller, PLLC

(57) ABSTRACT

An authentication server (16) in a home network (18) of a wireless device (10) receives, from a network node (14), a request (20) for authentication data (22) based on which to authenticate the wireless device (10). The request (20) indicates a serving network (12) on which the authentication data (22) is to be based. The authentication server (16) checks whether or not the network node (14) is authorized to request authentication data (22) that is based on the indicated serving network (12).

20 Claims, 21 Drawing Sheets

(56) References Cited

U.S. PATENT DOCUMENTS

| | | | |
|---|---|---|---|
| 8,881,237 B2* | 11/2014 | Suh | H04W 36/0038 380/278 |
| 9,521,139 B2* | 12/2016 | Lee | H04L 63/0853 |
| 9,654,473 B2* | 5/2017 | Miller | H04L 63/0815 |
| 10,764,286 B2* | 9/2020 | Oberheide | H04L 63/0815 |
| 10,959,097 B1* | 3/2021 | Chen | H04W 12/06 |
| 11,622,276 B1* | 4/2023 | Wan | H04W 88/182 455/411 |
| 2004/0030932 A1* | 2/2004 | Juels | H04L 9/0844 713/168 |
| 2005/0125493 A1* | 6/2005 | Chaskar | H04L 61/4511 709/203 |
| 2008/0096553 A1* | 4/2008 | Saksena | H04W 28/06 455/426.2 |
| 2008/0198861 A1* | 8/2008 | Makela | H04W 12/06 726/4 |
| 2010/0242106 A1* | 9/2010 | Harris | H04L 63/08 709/224 |
| 2011/0154443 A1* | 6/2011 | Thakur | G06F 21/41 726/3 |
| 2013/0124285 A1* | 5/2013 | Pravetz | G06Q 20/40 705/14.23 |
| 2013/0125226 A1* | 5/2013 | Shah | H04W 12/0431 726/7 |
| 2017/0332238 A1* | 11/2017 | Bansal | H04L 67/125 |
| 2019/0104409 A1* | 4/2019 | Wu | H04L 63/20 |
| 2019/0253885 A1* | 8/2019 | Bykampadi | H04L 63/0272 |
| 2021/0036988 A1* | 2/2021 | McKibben | H04W 12/06 |
| 2022/0086734 A1* | 3/2022 | Aggarwal | H04L 63/0884 |
| 2022/0124079 A1* | 4/2022 | Patil | H04L 63/08 |
| 2022/0240085 A1* | 7/2022 | Long | H04W 12/06 |
| 2022/0338104 A1* | 10/2022 | Son | H04W 12/06 |
| 2023/0308871 A1* | 9/2023 | Castellanos Zamora | H04W 12/084 |

FOREIGN PATENT DOCUMENTS

| | | |
|---|---|---|
| KR | 20170038096 A | 4/2017 |
| WO | 2019137490 A1 | 7/2019 |
| WO | 2019196699 A1 | 10/2019 |

OTHER PUBLICATIONS

3GPP, "3GPP TR 33.855 V1.5.0", 3rd Generation Partnership Project; Technical Specification Group Services and System Aspects; Security Aspects; Study on security aspects of the 5G Service Based Architecture (SBA) (Release 16), May 2019, 1-66.

3GPP, "3GPP TR 33.855 V16.0.0", 3rd Generation Partnership Project; Technical Specification Group Services and System Aspects; Security Aspects; Study on security aspects of the 5G Service Based Architecture (SBA) (Release 16), Jul. 2020, 1-104.

3GPP, "3GPP TS 29.509 V16.3.0", 3rd Generation Partnership Project; Technical Specification Group Core Network and Terminals; 5G System; Authentication Server Services; Stage 3 (Release 16), Mar. 2020, 1-58.

3GPP, "3GPP TS 29.509 V16.4.0", 3rd Generation Partnership Project; Technical Specification Group Core Network and Terminals; 5G System; Authentication Server Services; Stage 3 (Release 16), Jun. 2020, 1-60.

3GPP "3GPP TS 29.510 V16.3.0", 3rd Generation Partnership Project; Technical Specification Group Core Network and Terminals; 5G System; Network Function Repository Services; Stage 3 (Release 16), Mar. 2020, 1-172.

* cited by examiner

RECEIVING, FROM A NETWORK NODE, A REQUEST FOR AUTHENTICATION DATA BASED ON WHICH TO AUTHENTICATE THE WIRELESS DEVICE, WHEREIN THE REQUEST INDICATES A SERVING NETWORK ON WHICH THE AUTHENTICATION DATA IS TO BE BASED
1300

UNDER ONE OR MORE SKIP CHECK CONDITIONS, REFRAINING FROM CHECKING WHETHER THE NETWORK NODE IS AUTHORIZED TO REQUEST AUTHENTICATION DATA THAT IS BASED ON THE INDICATED SERVING NETWORK
1310

*FIGURE 13*

AUTHENTICATION OF A WIRELESS DEVICE IN A WIRELESS COMMUNICATION NETWORK

TECHNICAL FIELD

The present application relates generally to a wireless communication network, and relates more particularly to authentication of a wireless device configured for use in such a network.

BACKGROUND

A wireless device needs to authenticate itself to a network in order to obtain communications service from that network. The wireless device and the network also need to establish keying material (e.g., cryptographic keys) for use in subsequent security procedures for securing the communications service. In a 5G network, for example, a security anchor function (SEAF) in the device's serving network requests an authentication server for authentication data, e.g., one or more authentication vectors. Based on this authentication data, the SEAF can authenticate the wireless device and establish the keying material. To prevent misuse of the authentication data by a different serving network, the authentication server binds the authentication data to the serving network from which the authentication data request came. The SEAF in this regard indicates the serving network's name in the authentication data request, and the authentication server binds the authentication data to the indicated serving network name.

Problematically, though, this approach proves susceptible to one serving network claiming to be a different serving network, in order to surreptitiously acquire authentication data that would trick the wireless device into connecting to it. To guard against this sort of attack, the authentication server needs a reliable way to validate that the serving network name indicated in the authentication data request actually identifies the serving network from which the request originates.

SUMMARY

In order to ensure a network node is authorized to request authentication data that is based on a certain serving network indicated in the request, some embodiments herein exploit other, supplemental information that indicates from which serving network the request originated. This supplemental information may include, for example, an access token presented by the requesting network node, an assertion by an intermediate proxy that relays the request, or a profile of a node identified by an identity provided by the requesting network node. In these and other examples, then, the supplemental information may be exploited from a different message, protocol layer, or origin than the request itself, e.g., which may be secured in a different way than the serving network indicator the request, so that the supplemental information functions as a different or separate source of information about the serving network from which the request originated. The supplemental information may thereby create or inform an expectation on the part of the authentication serve about which serving network indication should be included in the authentication data request. Accordingly, some embodiments effectively check whether a serving network indicated in the request is the same as the one expected after accounting for the supplemental information. If the check reveals a discrepancy, the authentication server may reject the authentication data request. Some embodiments thereby advantageously safeguard against one serving network claiming to be a different serving network.

More particularly, embodiments herein include a method performed by an authentication server in a home network of a wireless device. The method comprises receiving, from a network node, a request for authentication data based on which to authenticate the wireless device. The request indicates a serving network on which the authentication data is to be based. The method further comprises checking whether or not the network node is authorized to request authentication data that is based on the indicated serving network. In some embodiments, the checking is based on an access token that is presented by the network node and that indicates a network of a node to which the access token was issued. In other embodiments, the checking is based on an assertion by an intermediate proxy indicating a network that is associated with a connection over which the intermediate proxy received the request. In still other embodiments, the checking is based on a profile of a node identified by an identity provided by the network node, where the profile indicates a network to which the node belongs. Regardless, in some embodiments, the method also comprises accepting or rejecting the request depending on the checking.

In some embodiments, the request includes a serving network name that indicates the serving network on which the authentication data is to be based. In one such embodiment, said checking comprises forming an expected serving network name based on the access token, the assertion, or the profile, and comparing the serving network name included in the request with the expected serving network name.

In some embodiments, the access token, the assertion, or the profile includes a public land mobile network identity. In one such embodiment, the request includes a serving network name that indicates the serving network on which the authentication data is to be based. In this case, said checking in some embodiments may comprise comparing the serving network name included the request with an expected serving network name formed from the public land mobile network identity. Or, said checking may comprise comparing a public land mobile network identity extracted from the serving network name included in the request with the public land mobile network identity.

In some embodiments, the method further comprises receiving the access token, the assertion, or the identity in or with the request.

In some embodiments, said checking is based on the access token. In one such embodiment, the access token is secured by a network repository (e.g., a Network Repository Function, NRF) with a digital signature or a Message Authentication Code, MAC, where the access token indicates a scope of services to which the access token authorizes access by a consumer, and where the access token indicates the network of the node to which the access token was issued via a consumer network identity. In one such embodiment, said checking is based on said consumer network identity. In some embodiments, the access token is a JavaScript Object Notation, JSON, Web Token or an OAuth access token.

In some embodiments, said checking is based on said assertion.

In some embodiments, the intermediate proxy is in the home network, wherein the connection is Transport Layer Security, TLS, connection between the intermediate proxy in the home network and another intermediate proxy in a visited network from which the request was received. In one such embodiment, the network associated with the connection is associated with a context for the TLS connection. In some embodiments, the assertion indicates the network that is associated with the context for the TLS connection by indicating a remote public land mobile network identity corresponding to the context for the TLS connection.

In some embodiments, said checking is based on said profile.

In some embodiments, the method further comprises further comprising retrieving the profile from a network repository or from a cache at the authentication server, using the identity provided by the network node.

In some embodiments, the authentication server implements an Authentication Server Function, AUSF, and the network node implements an Access and Mobility Function, AMF, or a Security Anchor Function, SEAF, within an AMF instance. I some embodiments, the intermediate proxy is a Security Edge Protection Proxy, SEPP.

In some embodiments, the method further comprises, based on or as part of accepting the request, transmitting the requested authentication data to the network node.

Embodiments herein also include a method performed by a network repository. The method comprises receiving, from a network node, a request for an access token authorizing the network node to consume services provided by another network node. The method also comprises issuing the requested access token to the network node. In some embodiments, the issued access token unconditionally indicates a network of the network node to which the access token is issued.

In one such embodiment, the request is for an access token authorizing the network node to consume services provided by another network node in the same network as the network node.

In some embodiments, the access token is secured by the network repository with a digital signature or a Message Authentication Code, MAC, and the access token unconditionally indicates the network of the network node to which the access token is issued via a consumer network identity.

In some embodiments, the access token is a JavaScript Object Notation, JSON, Web Token or an Oath 2.0 access token.

In some embodiments, the network node implements an Access and Mobility Function, AMF, or a Security Anchor Function, SEAF, within an AMF instance, and the another network node implements an Authentication Server Function, AUSF.

Embodiments herein further include a method performed by a proxy in a home network of a wireless device. The method comprises receiving, from a network node, a request for authentication data based on which to authenticate the wireless device. The request indicates a serving network on which the authentication data is to be based. The method further comprises transmitting the request towards an authentication server in the home network. The method also comprises transmitting an assertion towards the authentication server indicating a network that is associated with a connection over which the proxy received the request.

In some embodiments, the connection is Transport Layer Security, TLS, connection, and the network that is associated with the connection is associated with a context for the TLS connection.

In some embodiments, transmitting the assertion comprises transmitting the assertion in an application-layer header of a message conveying the request.

In some embodiments, the proxy is a Security Edge Protection Proxy, SEPP, and the authentication server implements an Authentication Server Function, AUSF.

Embodiments herein also include a method performed by a network node in a serving network of a wireless device. The method comprises transmitting, towards an authentication server, a request of the network node for authentication data based on which to authenticate the wireless device. The request indicates a serving network on which the authentication data is to be based. In some embodiments, the method further comprises transmitting an identity of the network node in or with the request.

In some embodiments, the network node implements an Access and Mobility Function, AMF, or a Security Anchor Function, SEAF, within an AMF instance, and the authentication server implements an Authentication Server Function, AUSF.

Embodiments herein further include a method performed by an authentication server in a home network of a wireless device. The method comprises receiving, from a network node, a request for authentication data based on which to authenticate the wireless device. The request indicates a serving network on which the authentication data is to be based. In some embodiments the method also comprises, under one or more skip check conditions, refraining from checking whether the network node is authorized to request authentication data that is based on the indicated serving network.

In some embodiments, the one or more skip check conditions include the network node belonging to the same network as the authentication server.

Embodiments herein further include corresponding apparatus, computer programs, and carriers of those computer programs. For example, embodiments include an authentication server configured for use in a home network of a wireless device. The authentications server may comprise communication circuitry and processing circuitry. The authentication server, e.g., via the communication circuitry and the processing circuitry, may be configured to receive, from a network node, a request for authentication data based on which to authenticate the wireless device. The request indicates a serving network on which the authentication data is to be based. The authentication server may also be configured to check whether or not the network node is authorized to request authentication data that is based on the indicated serving network. In some embodiments, the checking is based on an access token that is presented by the network node and that indicates a network of a node to which the access token was issued. In other embodiments, the checking is based on an assertion by an intermediate proxy indicating a network that is associated with a connection over which the intermediate proxy received the request. In still other embodiments, the checking is based on a profile of a node identified by an identity provided by the network node, where the profile indicates a network to which the node belongs. Regardless, in some embodiments, the authentication server is configured to accept or reject the request depending on the checking.

Embodiments herein further include a network repository, e.g., comprising communication circuitry and processing circuitry. The network repository is configured to receive, from a network node, a request for an access token authorizing the network node to consume services provided by another network node. The network repository is also configured to issue the requested access token to the network node. In some embodiments, the issued access token unconditionally indicates a network of the network node to which the access token is issued.

Embodiments herein also include a proxy configured for use in a home network of a wireless device. The proxy may comprise communication circuitry and processing circuitry. The proxy is configured, e.g., via such circuitry, to receive, from a network node, a request for authentication data based on which to authenticate the wireless device. The request indicates a serving network on which the authentication data is to be based. The proxy is also configured to transmit the request towards an authentication server in the home network. The proxy may further be configured to transmit an assertion towards the authentication server indicating a network that is associated with a connection over which the proxy received the request.

Embodiments moreover include a network node configured for use in a serving network of a wireless device. The network node may comprise communication circuitry and processing circuitry. The network node, e.g., via such circuitry, may be configured to transmit, towards an authentication server, a request of the network node for authentication data based on which to authenticate the wireless device. The request indicates a serving network on which the authentication data is to be based. In some embodiments, the network node is further configured to transmit an identity of the network node in or with the request.

Embodiments herein also include an authentication server configured for use in a home network of a wireless device. The authentication server may comprise communication circuitry and processing circuitry. The authentication server may be configured to receive, from a network node, a request for authentication data based on which to authenticate the wireless device. The request indicates a serving network on which the authentication data is to be based. In some embodiments the authentication server is configured to, under one or more skip check conditions, refraining from checking whether the network node is authorized to request authentication data that is based on the indicated serving network.

Embodiments herein also include a method performed by an authentication server in a home network of a wireless device. The method comprising receiving, from a network node, an application-layer message that comprises an application-layer message header and an application-layer message body. The application-layer message body includes a request for authentication data based on which to authenticate the wireless device. The request (20) indicates a serving network on which the authentication data is to be based. And the application-layer message header includes supplemental information about a serving network from which the request for authentication data originated. The method may also comprise checking whether or not the network node is authorized to request authentication data that is based on the serving network indicated by the request. Such said checking is based on the supplemental information included in the application-layer message header. The method may further comprise accepting or rejecting the request depending on said checking.

In some embodiments, the request includes a serving network name that indicates the serving network on which the authentication data is to be based. In this case, said checking comprises forming an expected serving network name based on the supplemental information; and comparing the serving network name included in the request (20) with the expected serving network name.

In some embodiments, the supplemental information includes a public land mobile network identity. In one such embodiment, the request includes a serving network name that indicates the serving network on which the authentication data is to be based. In one embodiment, said checking comprises comparing the serving network name included the request with an expected serving network name formed from the public land mobile network identity; or comparing a public land mobile network identity extracted from the serving network name included in the request with the public land mobile network identity.

In some embodiments, supplemental information comprises an assertion by an intermediate proxy that relays the request. In one such embodiment, the intermediate proxy is in the home network, the connection is Transport Layer Security, TLS, connection between the intermediate proxy in the home network and another intermediate proxy in a visited network from which the request was received, and the network associated with the connection is associated with a context for the TLS connection. In one embodiment, for example, the assertion indicates the network that is associated with the context for the TLS connection by indicating a remote public land mobile network identity corresponding to the context for the TLS connection.

In some embodiments, the method further comprises, based on or as part of accepting the request, transmitting the requested authentication data to the network node.

Embodiments herein also include a method performed by a node. The method comprises receiving an application-layer message that comprises an application-layer message header and an application-layer message body. The application-layer message body includes a request for authentication data based on which to authenticate a wireless device. The request indicates a serving network on which the authentication data is to be based. The method further comprises processing the application-layer message header. Such processing includes adding to the application-layer message header supplemental information about a serving network from which the request for authentication data originated. The method also comprises transmitting the application-layer message comprising the application-layer message body and the application-layer message header including the supplemental information.

In some embodiments, for example, the node is an intermediate proxy that relays the request. In one such embodiment, the supplemental information comprises an assertion by the intermediate proxy.

In one embodiment, the intermediate proxy is in the home network, the connection is Transport Layer Security, TLS, connection between the intermediate proxy in the home network and another intermediate proxy in a visited network from which the request was received, and the network associated with the connection is associated with a context for the TLS connection. For example, the assertion may indicate the network that is associated with the context for the TLS connection by indicating a remote public land mobile network identity corresponding to the context for the TLS connection.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 13 is a logic flow diagram of a method performed by an authentication server according to some embodiments.

DETAILED DESCRIPTION

Figure 1:
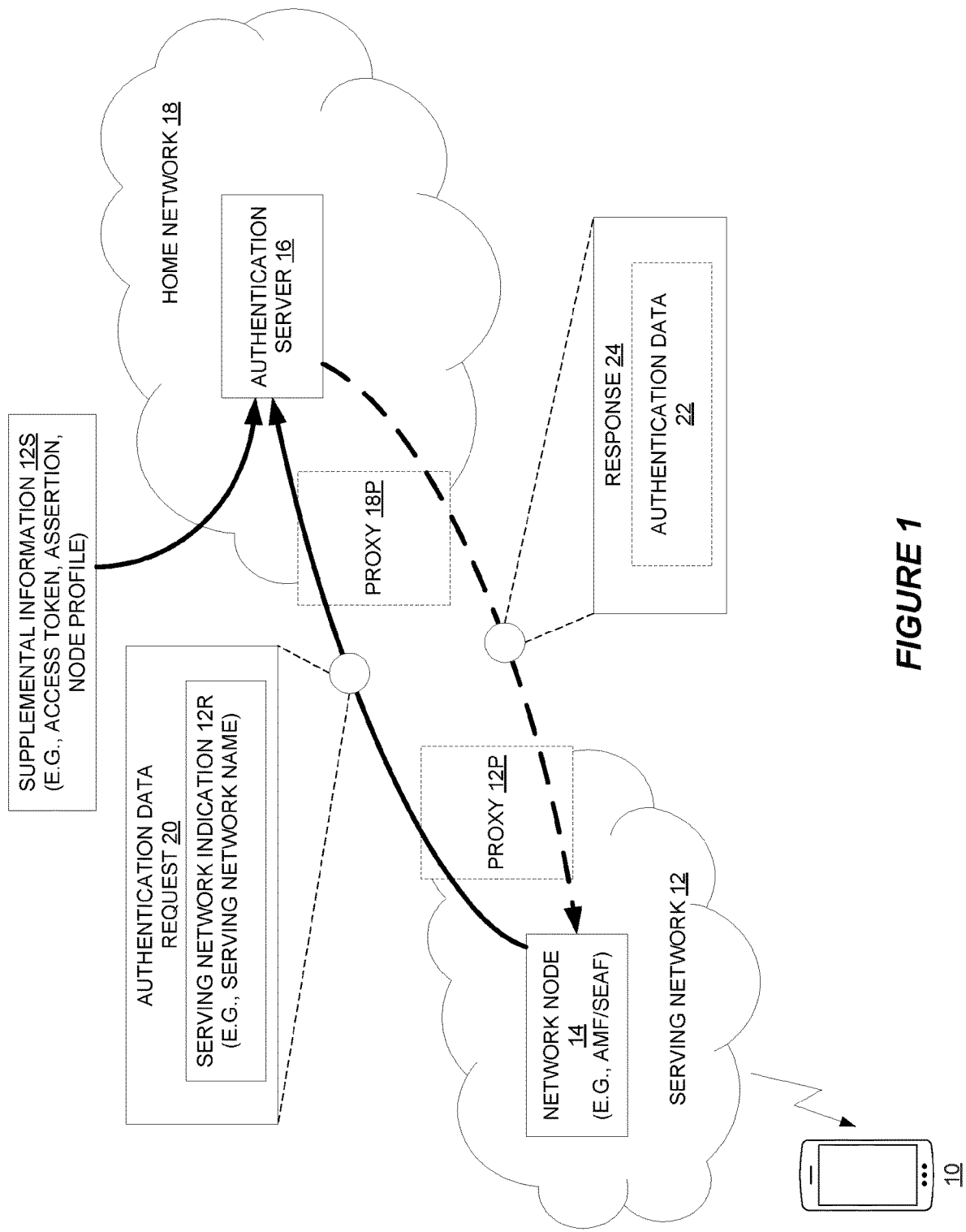
FIG. 1 is a block diagram of a network node in a serving network and an authentication server in a home network according to some embodiments.

According to embodiments shown in FIG. 1, a wireless device 10 is to perform an authenticate procedure with a serving network 12 (e.g., a 5G network) in order to obtain communication service from that serving network 12. The authentication procedure may for instance be a primary authentication and key agreement (AKA) procedure via which the wireless device 10 and the serving network 12 mutually authenticate one another and provide keying material (e.g., an anchor key $K_{SEAF}$) that can be used in subsequent security procedures. Regardless, as part of this procedure, the wireless device 10 transmits subscription information (e.g., a Subscription Permanent Identifier, SUPI, or a temporary user identity) towards a network node 14 in the serving network 12, e.g., where the network node 14 implements a Security Anchor Function (SEAF) in a 5G system.

Having received subscription information from the wireless device 10, the network node 14 employs the assistance of an authentication server 16 in the home network 18 of the wireless device 10 e.g., where the authentication server 16 may implement an Authentication Server Function (AUSF) in a 5G system. In embodiments where the serving network 12 is different than the home network 18, as shown in the example of FIG. 1, this may mean that the network node 14 communicates with the authentication server 16 indirectly via one or more intermediate proxies 12P, 18P, e.g., one or more Security Edge Protection Proxies (SEPPs) in a 5G system. No matter whether the network node 14 communicates with the authentication server 16 directly or indirectly, the network node 14 transmits an authentication data request 20 to the authentication server 16. In 5G embodiments where the authentication server 16 is an AUSF and the network node 14 implements an AUSF, the authentication data request 20 may for example be an Nausf_UEAuthentication_Authenticate Request, e.g., as otherwise specified in 3GPP Technical Specification (TS) 29.509 v16.4.0.

The authentication data request 20 requests the authentication server 16 for authentication data 22 based on which to authenticate the wireless device 10. In some embodiments, the authentication data request 20 includes the subscription information from the wireless device 10, so that the authentication data 22 can be derived from and/or be specific for that subscription information. The authentication data request 20 as shown alternatively or additionally includes a serving network indication 12R. This indication 12R indicates a serving network on which the authentication data 22 is to be based. The indication 12R may for instance be a serving network name, where such a serving network name may be the concatenation of a service code (e.g., 5G) and an identity of the serving network 12 (e.g., a Public Land Mobile Network, PLMN, ID). Or, as another example, the indication 12R may be just the identity of the serving network 12, e.g., just a PLMN ID.

Regardless of the particular form of the indication 12R, the authentication data 22 in some embodiments is to be based on the indicated serving network in the sense that the authentication data 22 (or at least a portion of the authentication data 22) is to be bound to the indicated serving network. For example, where the authentication data 22 includes an anchor key $K_{SEAF}$, the anchor key $K_{SEAF}$ may be bound to the indicated serving network, e.g., by including the serving network indication 12R into the chain of key derivations that leads from a long-term subscriber key (associated with the wireless device's subscription information) to the anchor key $K_{SEAF}$. Basing the authentication data 22 on the indicated serving network in this or other ways is intended to prevent one serving network from claiming to be a different serving network and acquiring authentication data valid for authenticating wireless devices subscribed to that different serving network.

In some embodiments, though, the indication 12R may be set to any value by any serving network. That is, in some embodiments, no constraints are imposed on which serving network may set the indication 12R to which values, e.g., due to the nature of the indication 12R being a free-form text field.

In these and other embodiments, then, the authentication server 16 checks whether or not the network node 14 is authorized to request authentication data 22 that is based on the indicated serving network 12. That is, the authentication server 16 checks whether or not the network node 14 is actually entitled to set the serving network indication 12R to the value included in the authentication data request 20. Such authorization or entitlement may be based on the network node 14 actually belonging to the serving network indicated by the serving network indicator 12R, on the basis that belonging to the indicated serving network authorizes the network node 14 to request authentication data 22 based on the indicated serving network. The authentication server 16 may accept or reject the authentication data request 20 based at least in part on this check. For example, if the check reveals the network node 14 is authorized to request authentication data 22 that is based on the indicated serving network 12, then the authentication server 16 may transmit to the network node 14 a response 24 that includes the requested authentication data 22. On the other hand, if the check reveals the network node 14 is not authorized to request such authentication data 22, the response 24 may instead omit the authentication data 22 and indicate the network node 14 is not authorized to have the authentication data 22 requested.

In order to check whether or not the network node 14 is authorized to request authentication data 22 that is based on the indicated serving network 12, the authentication server 16 according to some embodiments herein exploits other, supplemental information 12S. This supplemental information 12S may serve as a different, separate, or otherwise supplemental source of reliable information about the serving network from which the authentication data request 22 originated. The supplemental information 12S may thereby create or inform an expectation on the part of the authentication server 16 about which serving network indication 12R should be included in the authentication data request 20.

Equipped with this supplemental information, therefore, the authentication server 16 in some embodiments checks for any discrepancy between which serving network the authentication data request 20 actually indicates the authentication data 22 is to be based on (e.g., via the serving network indicator 12R) and which serving network the authentication server 16 expects to be indicated by the authentication data request 20 in view of the supplemental information 12S. Such discrepancy may serve as a basis for rejecting the request 20, to reliably safeguard against one serving network claiming to be a different serving network in a request for authentication data.

For example, in some embodiments where the request 20 includes a serving network name (SNN) as the serving network indicator 12R, the authentication server 16 may form an expected SNN based on the supplemental information 12S. The authentication server 16 may then compare the SNN received as the serving network indicator 12R in the request 20 with the expected SNN. The authentication server 16 may then accept or reject the request 20, depending respectively on whether or not the SNN is the same as the expected SNN according to that comparison.

As another example, in other embodiments where the request 20 includes a serving network name (SNN) as the serving network indicator 12R, the authentication server 16 may extract a serving network identity (e.g., PLMN identity) from the SNN included in the request 20 as the serving network indicator 12R. The authentication server 16 may then compare the extracted serving network identity with an expected serving network identity (e.g., expected PLMN ID) determined from the supplemental information 12S. The authentication server 16 may then accept or reject the request 20, depending respectively on whether or not the extracted serving network identity is the same as the expected serving network identity according to that comparison.

As yet another example, the authentication server 16 may form an expected SNN from a serving network identity determined from the supplemental information 12S. The authentication server 16 may then compare the SNN included in the request 20 with the expected SNN. The authentication server 16 then accepts or rejects the request 20, depending respectively on whether or not the SNN included in the request 20 is the same as the expected SNN according to that comparison.

No matter the particular approach to checking the serving network indicated by the request 20 against the serving network suggested by the supplemental information 12S, the supplemental information 12S in some embodiments may accompany the authentication data request 20. For example, the supplemental information 12S may be included in or received with the request 20, or be included in or received with the same container message or signaling as the request 20. In other embodiments, the supplemental information 12S may be fetched from another node (not shown) based on the authentication data request 22.

Figure 2:
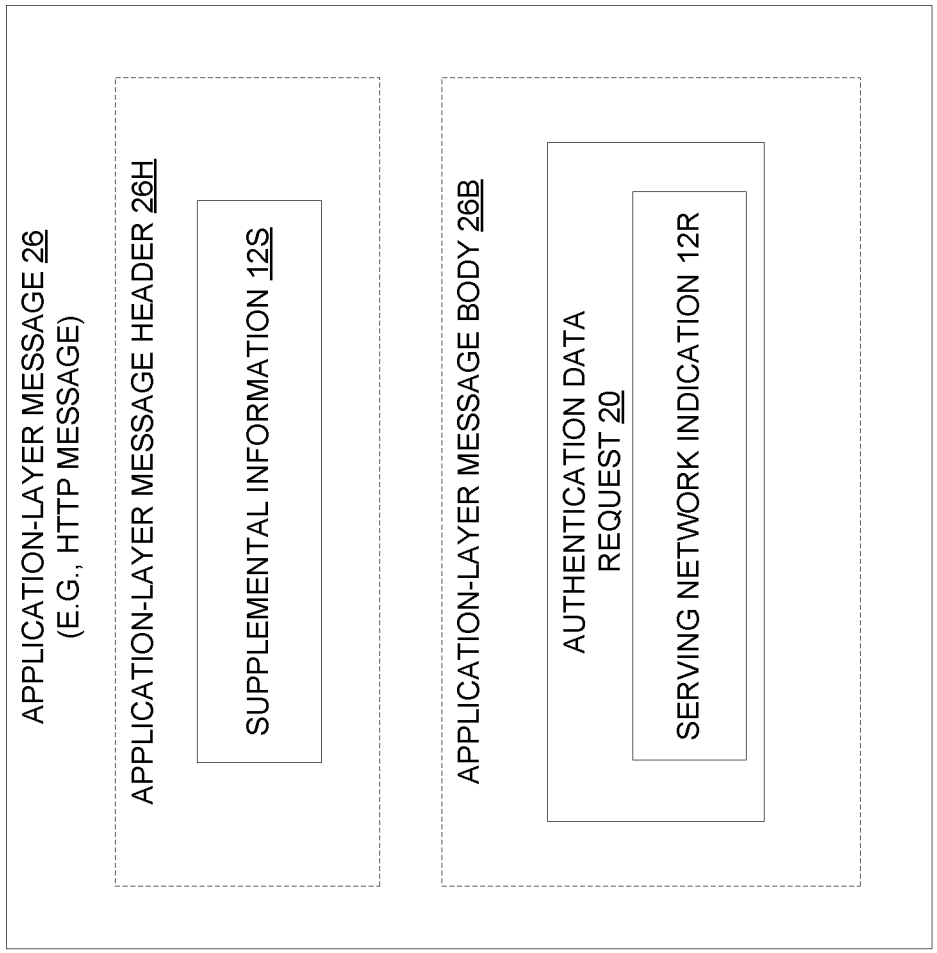
FIG. 2 is a block diagram of an application-layer message according to some embodiments.

Alternatively or additionally, the supplemental information 12S and the authentication data request 20 may in some embodiments be included in different parts of the same container message, and/or be conveyed by different protocol layers. FIG. 2 illustrates one example embodiment in this regard.

As shown in FIG. 2, the network node 14 conveys the authentication data request 20 within an application-layer message 26, e.g., a HyperText Transfer Protocol (HTTP) message. This application-layer message 26 comprises an application-layer message header 26H (e.g., an HTTP header) and an application-layer message body 26B (e.g., an HTTP body or payload). In this example, the authentication data request 20 is included in the application-layer message body 26B, e.g., in the form of a JavaScript Object Notation (JSON) body. Included in the application-layer message body 26B, the authentication data request 20 is not processed by any intermediate proxies or other nodes, meaning that the information conveyed by the body 26B (including the serving network indicator 12R) will not have been validated by any node upon receipt by the authentication server 16. Notably, though, the application-layer message header 26H according to some embodiments in this example includes the supplemental information 12S. Unlike the application-layer message body 26B, this header 26H (including the supplemental information 12S) may have been processed and/or otherwise verified by an intermediate proxy or other node. Some embodiments therefore capitalize on the inclusion of the supplemental information 12S in the header 26H as an opportunity to acquire reliable information about the origin of the authentication data request 22 in the body 26B.

Figure 3:
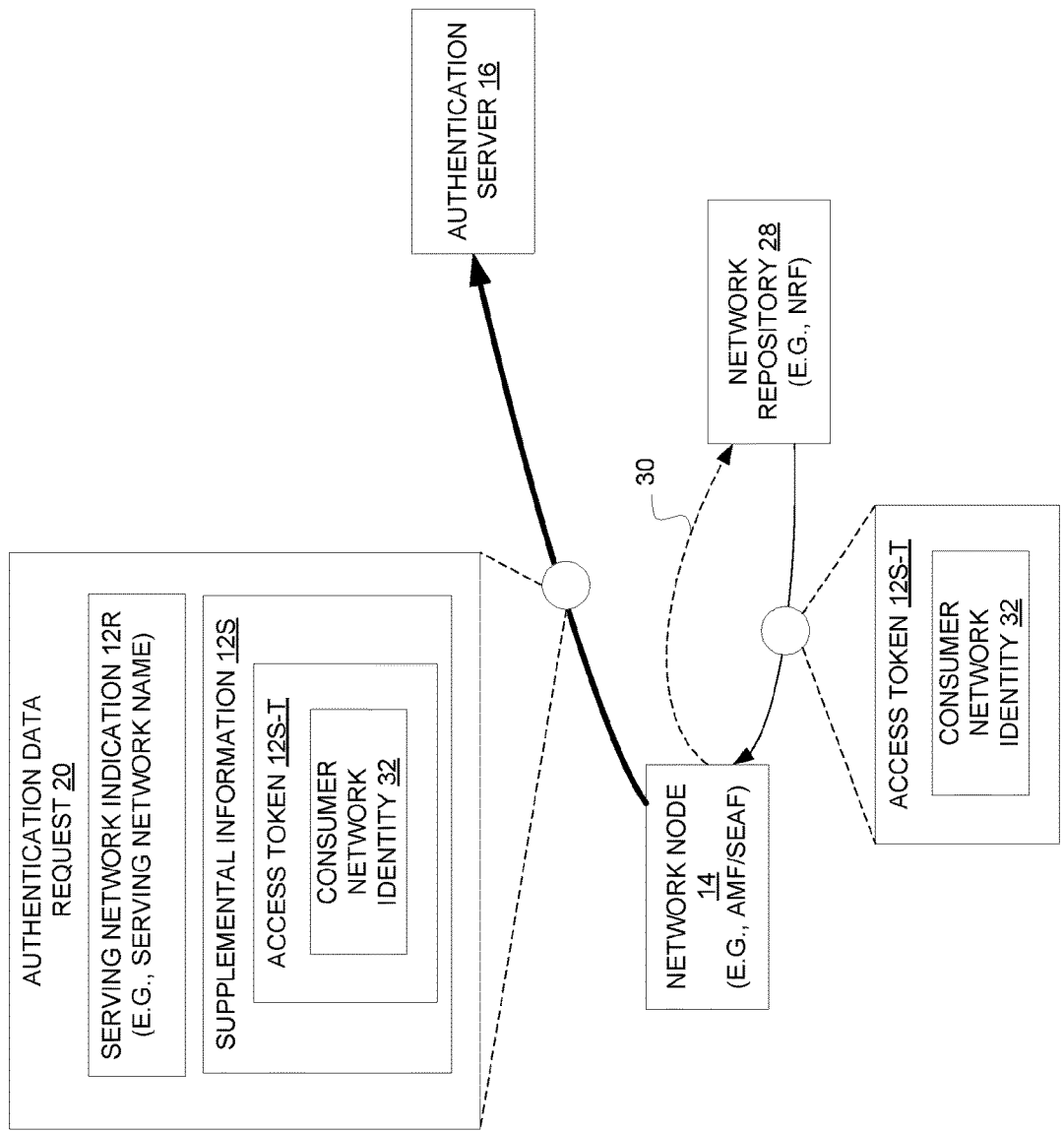
FIG. 3 is a block diagram of a network node, authentication server, and network repository using an access token for an authentication data request according to some embodiments.

Consider now some examples of the supplemental information 12S. In one example, the supplemental information 12S includes an access token that is presented by the network node 14 and that indicates a network of a node to which the access token was issued. FIG. 3 shows one such embodiment.

As shown in FIG. 3, a network repository 28 (e.g., implementing a network repository function, NRF) issues an access token 12S-T to the network node 14. The access token may for instance be a JSON Web Token or an OAuth access token (e.g., an OAuth 2.0 access token). Alternatively or additionally, the access token 12S-T may be secured by the network repository 28 with a digital signature or Message Authentication Code (MAC). Regardless, the network repository 28 may issue the access token 12S-T responsive to receiving a request 30 for such an access token 12S-T. The request 30 may for example constitute a request for authorization to consume or access a service from the authentication server 16, where the access token 12S-T serves as evidence of granted authorization. The access token 12S-T in this regard may indicate a scope of services to which the access token 12S-T authorizes access by the network node 14 as a consumer.

The access token 12S-T may also notably indicate the network of the node to which the access token 12S-T was issued via a consumer network identity 32. That is, the consumer network identity 32 indicates the network of the node to which the access token 12S-T was issued. Some embodiments thereby exploit this access token 12S-T as a reliable source of information about the serving network from which the authentication data request 20 originates. Indeed, in this case, the network node 14 may transmit the access token 12S-T with or in the authentication data request 20, to not only show the authentication server 16 that the network node 14 has authorization to consume a service from the authentication server 16 but also to show the authentication server 16 that the serving network indicated in the request 20 is the same as the serving network from which the request 20 originated. Correspondingly, the authentication server 16 may use the access token 12S-T to not only verify the network node 14 is authorized to consume a service from the authentication server 16, but also to check whether or not the network node 14 is authorized to request authentication data 22 that is based on the serving network indicated in the request. This latter check may for instance be performed based on the consumer network identity in the access token 12S-T. Notably, then, the authentication server's verification of the access token's integrity, in terms of verifying the validity of any digital signature or MAC, effectively provides assurance that the network indicated by the access token's consumer network identity 32 is not only the network to which the access token 12S-T was issued but also the network from which the authentication data request 20 originated.

Figure 4:
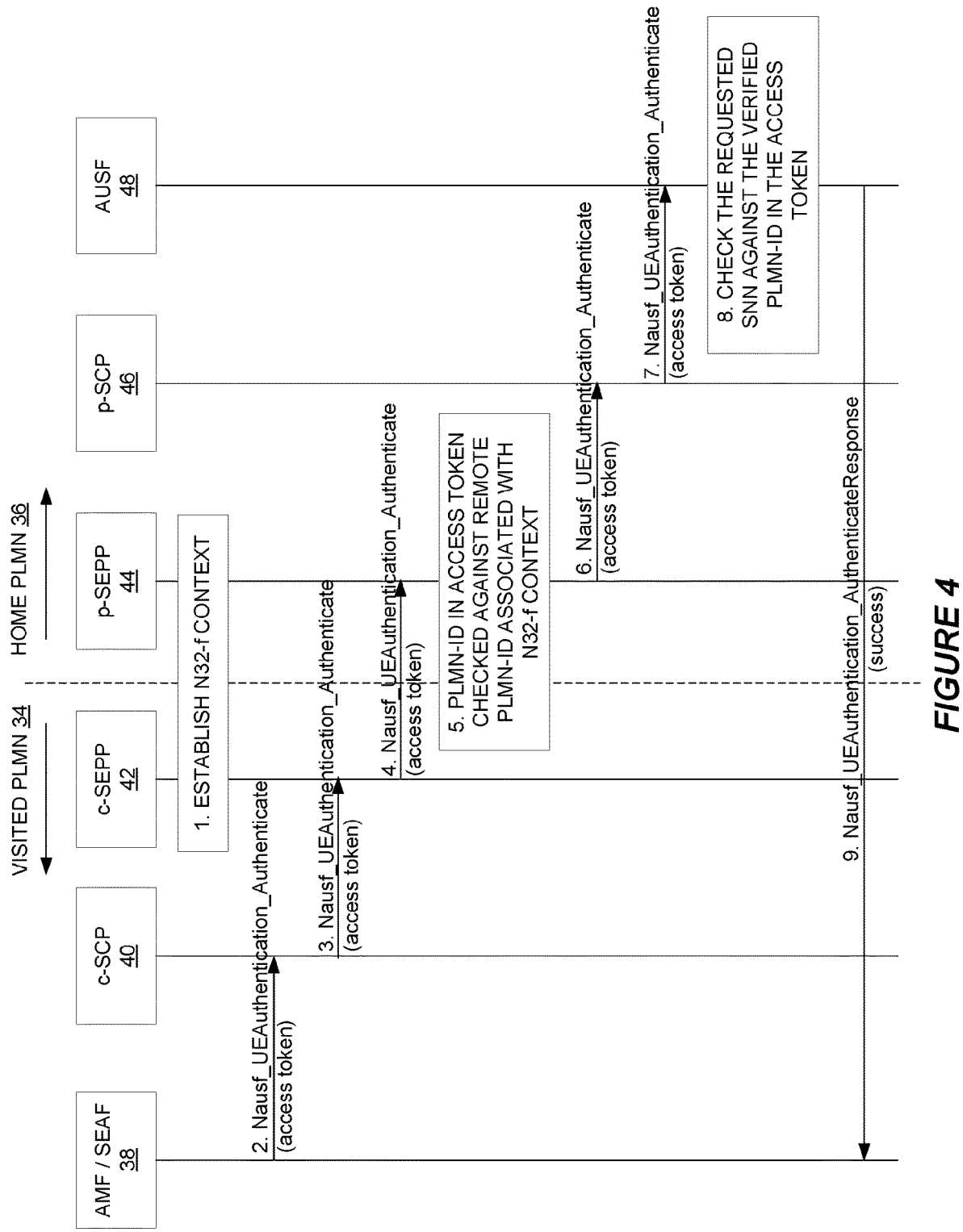
FIG. 4 is a call flow diagram of a procedure for requesting authentication data according to some embodiments that use an access token.

FIG. 4 illustrates additional details of one or more such embodiments as an example. In this example, the serving network 12 is exemplified as a visited PLMN 34 and the home network 18 is exemplified as a home PLMN 36. The network node 14 in the serving network 12 is exemplified as implementing an Access and Mobility Function (AMF) and/or an SEAF 38, while the authentication server 16 is exemplified as an AUSF 48. Similarly, the proxy 12P is exemplified as a consumer SEPP (c-CEPP) 42 and the proxy 18P is exemplified as a producer SEPP (p-CEPP) 44.

In this context, FIG. 4 shows that the c-SEPP 42 and the p-SEPP 44 establish an N32-f context between them (Step 1). This N32-f context may be associated with a Transport Layer Security (TLS) connection between the c-SEPP 42 and the p-SEPP 44. In order to establish the N32-f context, the c-SEPP 42 and the p-SEPP 44 exchange information that includes a remote PLMN-ID, a SEPP ID, and a SEPP address associated with each SEPP. The SEPPs 42, 44 may also authenticate one another usual mutual TLS, so that, once a connection between the SEPPs 42, 44 is established (or once an N32-f context ID is created between the SEPPs 42, 44), the receiving SEPP (p-SEPP 44) associates every request with such N32-f context ID with the remote PLMN-ID received from the c-SEPP 42 during establishment of the N32-f context. This allows the p-SEPP 44 to verify whether a network function (NF) in the visited PLMN 34 and the c-SEPP 42 are authorized to use the PLMN ID in a received N32-f message.

With the N32-f context established, the AMF/SEAF 38 as shown then transmits an Nausf_UEAuthentication_Authenticate request message to the AUSF 48, via a number of intermediate nodes interconnecting the visited PLMN 34 and the home PLMN 36. The Nausf_UEAuthentication_Authenticate request message indicates a serving network name (SNN) based on which authentication data 22 is requested. The AMF/SEAF 38 includes in this Nausf_UEAuthentication_Authenticate request message an access token issued to the AMF/SEAF 38 by an NRF (not shown). The access token authorizes the AMF/SEAF 38 to consume a service from the AUSF 48. The access token, as an example of the access token 12S-T discussed above, contains or otherwise indicates a PLMN-ID of the AMF/SEAF 38.

In order to transmit the Nausf_UEAuthentication_Authenticate request message to the AUSF 48 in the home PLMN 36, the AMF/SEAF 38 more particularly communicates the Nausf_UEAuthentication_Authenticate request message to a consumer service communication proxy (c-SCP) in the visited PLMN 34 (Step 2), which sends the Nausf_UEAuthentication_Authenticate request message to the c-SEPP 42 along with the access token (Step 3). The c-SEPP 42 then communicates the Nausf_UEAuthentication_Authenticate request message to the p-SEPP 44 (Step 4). Upon receipt, the p-SEPP 44 checks the PLMN-ID in the access token against the remote PLMN-ID associated with the N32-f context (Step 5). If the check passes, the p-SEPP 44 communicates the Nausf_UEAuthentication_Authenticate request message to the p-SCP 46, with the access token containing the now-verified PLMN-ID (Step 6). The p-SCP 46 finally communicates the Nausf_UEAuthentication_Authenticate request message to the AUSF 48 (Step 7). The AUSF 48 then checks the SNN indicated in the request message against the verified PLMN-ID in the access token. If the check passes, the AUSF 48 transmits a Nausf_UEAuthentication_AuthenticateResponse message (success) to the AMF/SEAF 38.

According to this embodiment, then, the AUSF 48 verifies that the SNN provided by the AMF/SEAF 38 within the AuthenticationInfo of the Nausf_UEAuthentication_Authenticate request message is equal (or otherwise corresponds to) the one in the access token. The AUSF 48 may for instance take the consumer PLMN ID within the access token presented by the AMF/SEAF 38 as the expected SNN. That is, the AUSF 48 uses the PLMN ID of the consumer NF included in the access token presented by the AMF/SEAF 38 as the expected SNN.

Note that, although the above embodiments were illustrated in a roaming context, the embodiments may also apply in a non-roaming context. In these and other embodiments, for example, the access token 12S-T may unconditionally indicate the network of the network node to which the access token 12S-T is issued. For example, the network repository 28 (e.g., NRF) in such embodiments always includes the PLMN ID of the consumer NF (i.e., the consumer PLMN ID) within the access token (at least for the Nausf_UEAU service), even in cases where the AMF is located in the same PLMN as the AUSF. In other embodiments, by contrast, the authentication server 16 skips checking the SNN against an expected SNN in the non-roaming scenario, e.g., based on trust of an NF within the same PLMN.

Figure 5:
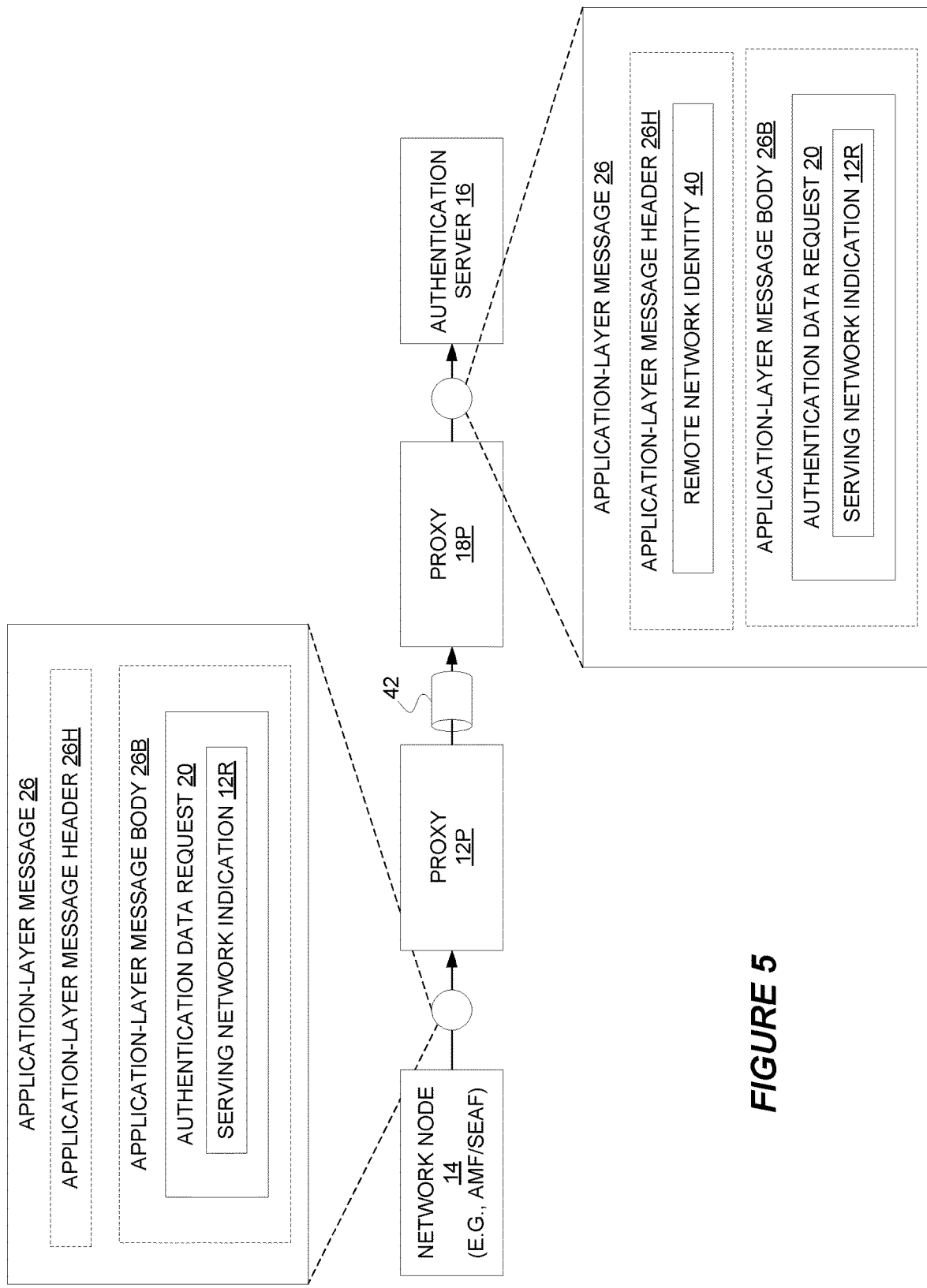
FIG. 5 is a block diagram of a network node, authentication server, and proxy using an assertion from the proxy for an authentication data request according to some embodiments.

Consider now another example of the supplemental information 12S from FIG. 1. Although not limited to such, this example may prove applicable in a case where no access token is available, e.g., when the OAuth Authorization framework is not used. In this and other embodiments, the supplemental information 12S may include an assertion by an intermediate proxy (e.g., proxy 18P) indicating a network that is associated with a connection over which the intermediate proxy received the authentication data request 20. FIG. 5 shows one such embodiment for a roaming scenario where the serving network 12 is different than the home network 18.

As shown in FIG. 5, the network node 14 transmits an application-layer message 26 (e.g., an HTTP message) that includes the authentication data request 20 in the application-layer message body 26B. The proxy 12P for the serving network 12 relays the application-layer message 26 to the proxy 18P for the home network 18P over a connection 42 with the proxy 18P. The connection 42 may for instance be a TLS connection. Regardless, the proxy 18P associates this connection 42 with a certain network. The associated network may for instance be a network associated with a context (e.g., an N32-f context) for the connection 42, as described above with respect to FIG. 4. The network associated with the context in these and other embodiments may therefore be indicated by a remote network identity 40 (e.g., a remote PLMN ID) corresponding to the context for the connection 42. Exploiting this association between the connection 42 over which the authentication data request 20 was received and the remote network identity 40, the proxy 18P in this embodiment provides an assertion to the authentication server 16 indicating the network that is associated with the connection 42 over which the proxy 18P received the request 20. In some embodiments, for example, the proxy 18P includes the remote network identity 40 in an application-layer message header 26H of the application-layer message 26 conveying the authentication data request 20, and sends the message 26 to the authentication server 16 as modified in that way.

Figure 6:
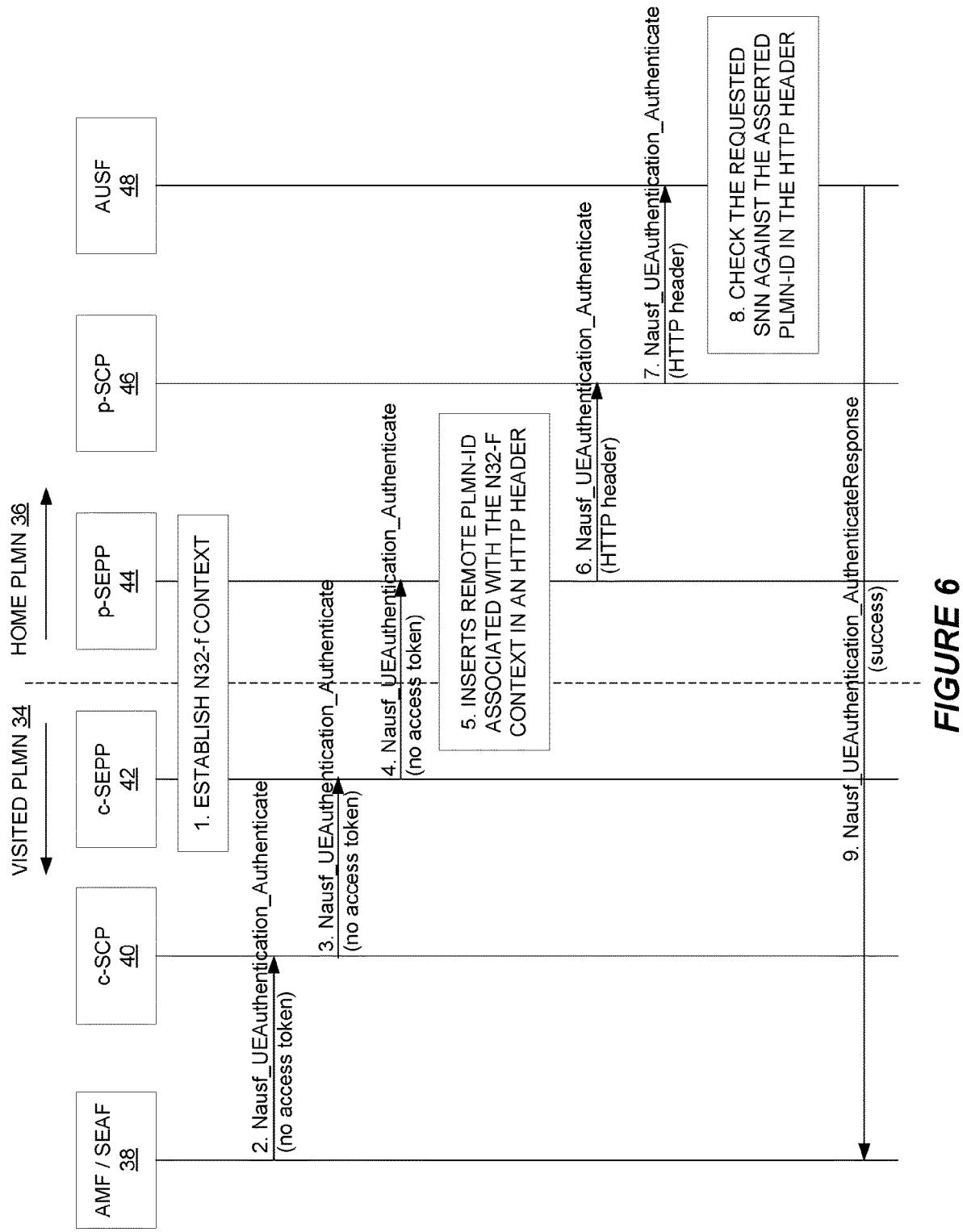
FIG. 6 is a call flow diagram of a procedure for requesting authentication data according to some embodiments that use an assertion from a proxy.

FIG. 6 illustrates additional details of this embodiment as an example. Steps in FIG. 6 are as described with respect to FIG. 4 except as noted. In this example, no OAuth framework is used, meaning that the AMF/SEAF 38 does not include an access token in the Nausf_UEAuthentication_Authenticate request message. To nonetheless provide supplemental information to the AUSF 48 about the serving network expected in the authentication data request 20, the p-SEPP 44 determines the remote PLMN-ID associated with the N32-f context for the connection over which the Nausf_UEAuthentication_Authenticate request message was received. The p-SEPP 44 then inserts that remote PLMN-ID in an HTTP header of the HTTP message containing the Nausf_UEAuthentication_Authenticate request message. This HTTP header may for example be a 3gpp-sbi-remote-plmnid header. This amounts to the p-SEPP 44 asserting the remote PLMN-ID associated to the N32-f context previously created. The p-SEPP 44 then communicates the modified Nausf_UEAuthentication_Authenticate request message to the p-SCP 46 (with the modified or inserted HTTP header), which then relays the message to the AUSF 48. The AUSF 48 correspondingly checks the SNN indicated by the Nausf_UEAuthentication_Authenticate request message against the asserted PLMN-ID in the HTTP header, in order to determine whether the AMF/SEAF 38 is authorized to use that SNN in the request. Specifically, the AUSF 48 uses the remote PLMN ID asserted by the p-SEPP 44 at the home PLMN as the expected SNN for SNN validation during the authentication procedure. If the check passes, the AUSF 48 sends the Nausf_UEAuthentication_AuthenticateResponse message (success) to the AMF/SEAF 38.

In some embodiments, the p-SEPP 44 asserts the remote PLMN-ID in this way only for the Nausf_UEAuthentication_Authenticate request message. In other embodiments, though, the p-SEPP 44 asserts the remote PLMN-ID as above for any service request to any NF.

Figure 7:
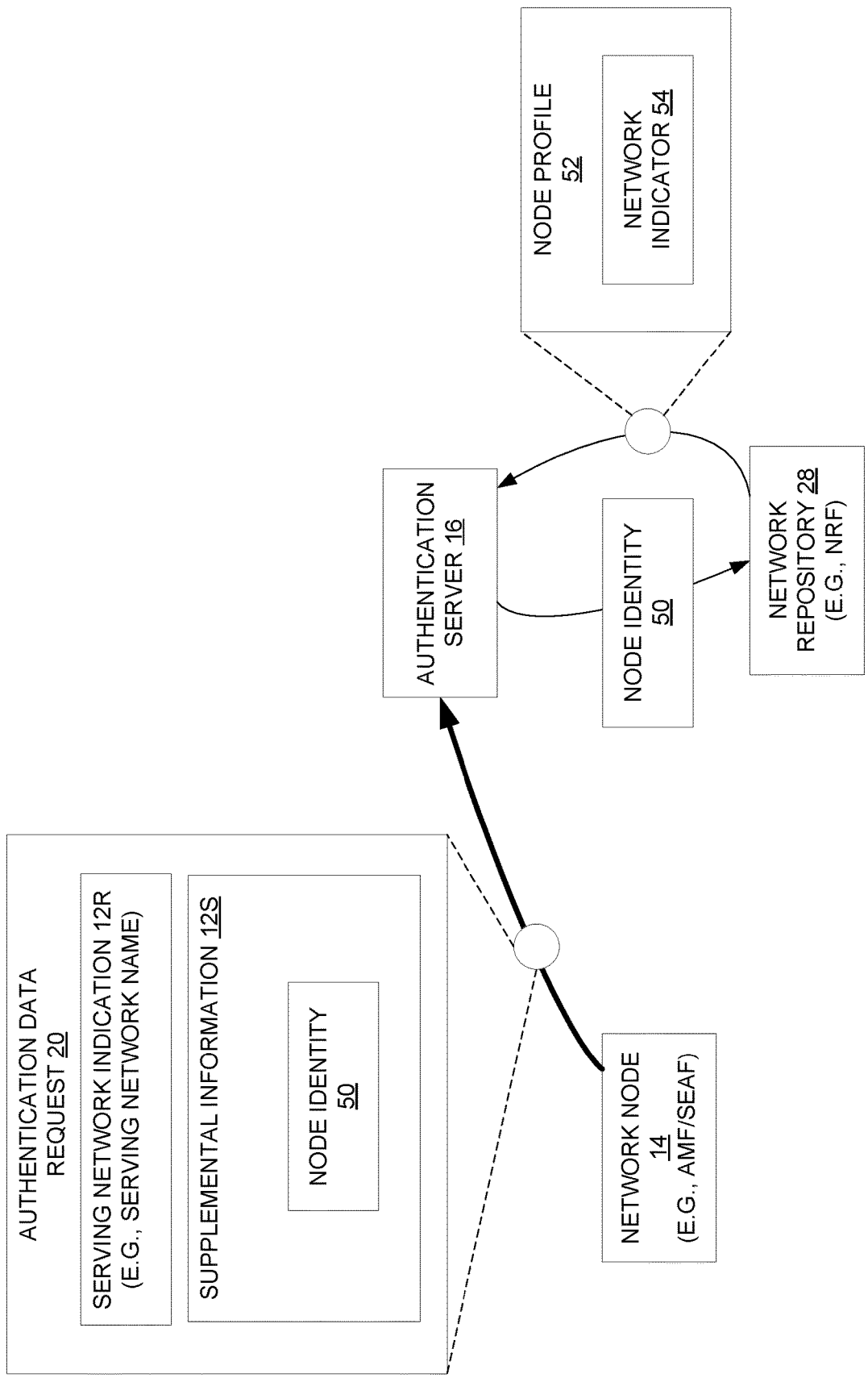
FIG. 7 is a block diagram of a network node, authentication server, and network repository using a node identity for an authentication data request according to some embodiments.

Consider now yet another example of the supplemental information 12S from FIG. 1. Although not limited to such, this example may also prove applicable in a case where no access token is available, e.g., when the OAuth Authorization framework is not used, even in a non-roaming scenario. In this and other embodiments, the supplemental information 12S may include a profile of a node identified by an identity that the network node 14 provides to the authentication server 16, e.g., with or in the authentication data request 10. This profile indicates a network to which the node belongs. FIG. 7 shows one such embodiment for a non-roaming scenario where the serving network 12 is the same as the home network 18.

As shown in FIG. 7, the network node 14 includes an identity 50 of the network node 14 as supplemental information 12S included in or with the authentication data request 10. The identity 50 may identify the network node 14 itself or an instance of a network function (NF) implemented by the network node 15. Where the network node 14 implements an AMF and/or SEAF, for example, the identity 50 may be an AMF instance ID or an SEAF instance ID. Regardless, the authentication server 16 transmits the identity 50 to the network repository 28 (e.g., NRF), in or in association with a request for a profile 52 corresponding to the identity 50. Where the identity is an AMF or SEAF identity, for instance, the profile 52 may be an AMF or SEAF profile. Notably, included in this profile 52 is a network indicator 54 that indicates a network associated with the node identified by the corresponding identity, e.g., as being a network to which the node belongs. In any event, the network repository 28 returns this node profile 52 to the authentication server 16, which uses the network indicator 54 to check whether or not the network node 14 is authorized to request authentication data that is based on the serving network indicated by the request 20.

Figure 8:
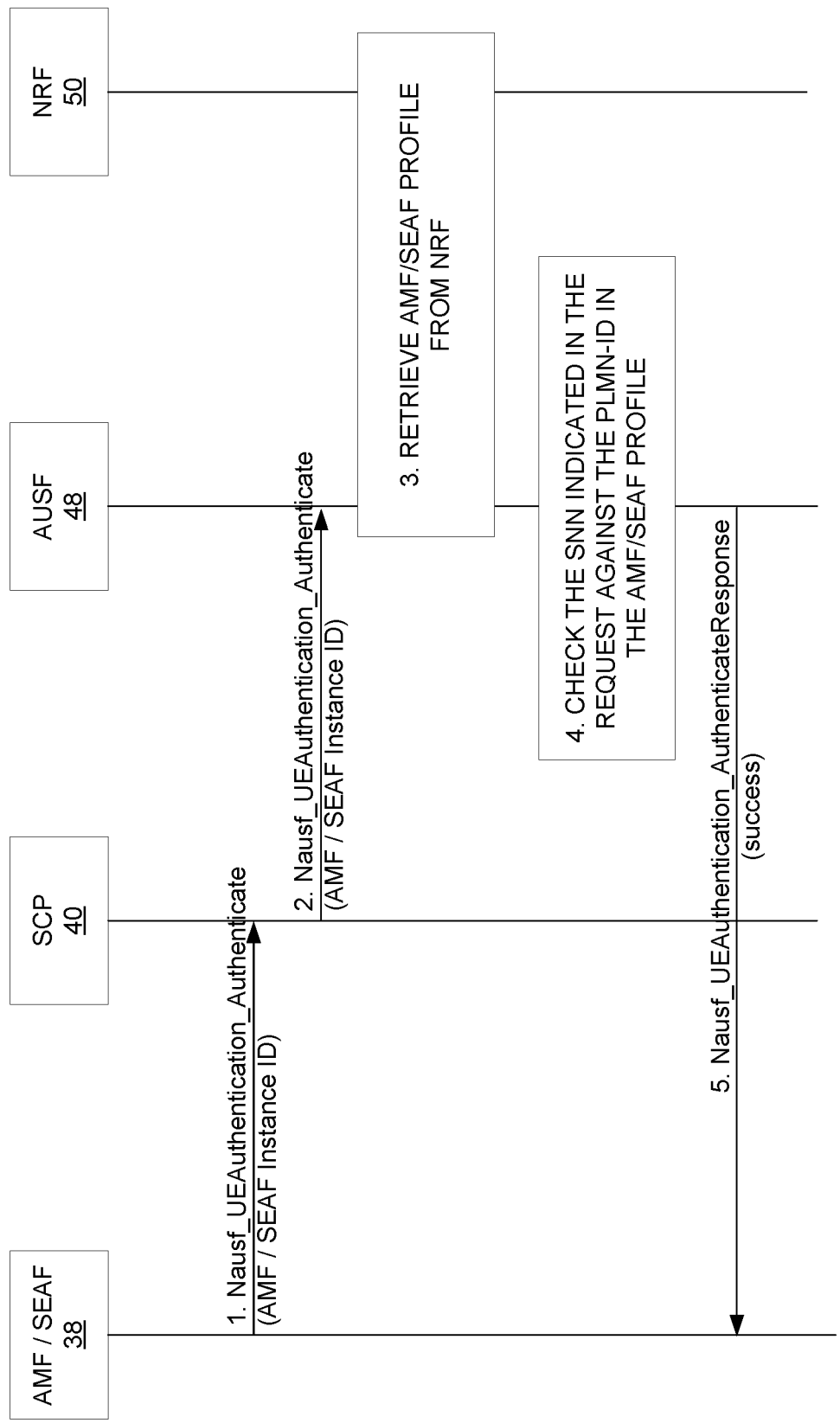
FIG. 8 is a call flow diagram of a procedure for requesting authentication data according to some embodiments that use a node identity.

FIG. 8 illustrates additional details of this embodiment as an example for a non-roaming scenario, e.g., in case the AMF/SEAF and AUSF are part of the same 5G Core administrative domain and use mutual TLS previous to the exchange of authentication requests. Steps in FIG. 6 are as described with respect to FIG. 4 except as noted. In this example, no OAuth framework is used, meaning that the AMF/SEAF 38 does not include an access token in the Nausf_UEAuthentication_Authenticate request message. To nonetheless provide supplemental information to the AUSF 48 about the serving network expected in the authentication data request 20, the AMF/SEAF 38 includes in the Nausf_UEAuthentication_Authenticate request message an AMF/SEAF instance ID that identifies the AMF/SEAF 38 (Step 1). The SCP 40 communicates this Nausf_UEAuthentication_Authenticate request message to the AUSF 48 (Step 2). The AUSF 48 retrieves the AMF/SEAF profile corresponding to the AMF/SEAF instance ID included in the Nausf_UEAuthentication_Authenticate request message (Step 3), at least if the profile is not cached at the AUSF 48. The AUSF 48 then checks the SNN indicated in the Nausf_UEAuthentication_Authenticate request message against the PLMN-ID in the AMF/SEAF profile (Step 4). If the check succeeds, the AUSF 48 transmits an Nausf_UEAuthentication_AuthenticateResponse message (success) to the AMF/SEAF 38.

In some embodiments, e.g., if the AMF/SEAF 38 does not include the AMF/SEAF ID in the request, the AUSF 48 may skip this check, e.g., based on mutual trust with NFs within its own PLMN.

No matter the particular nature of the supplemental information 12S, though, such information 12S advantageously creates or informs an expectation on the part of the authentication serve 16 about which serving network indication should be included in the authentication data request 20. By providing more reliability as to this, some embodiments improve protection against one serving network claiming to be a different serving network in the authentication data request.

Note that the authentication data 22 in any of the above embodiments may include any type of data on which authentication of the wireless device 10 may be based. In some embodiments, the authentication data 22 for example includes an authentication vector. An authentication vector may include an authentication token (AUTN), an expected response (XRES) or a hashed XRES (HXRES), a random number (RAND), and one or more cryptographic keys (e.g., a ciphering key (CK) and an integrity key (IK), or an anchor key $K_{SEAF}$) In this case, where the authentication data 22 includes an authentication vector, the network node 14 may retrieve the authentication token and random number from the authentication vector and transmit them to the wireless device 10. The wireless device 10 authenticates the network node 14 based on the authentication token. If the network node 14 is authenticated, the wireless device 10 returns a response (RES) generated from the random number. The network node 14 checks whether the response (RES) corresponds to the expected response (XRES) from the authentication vector. If it does, the network node 14 deems the wireless device 10 as authenticated for the communication service.

Figure 9:
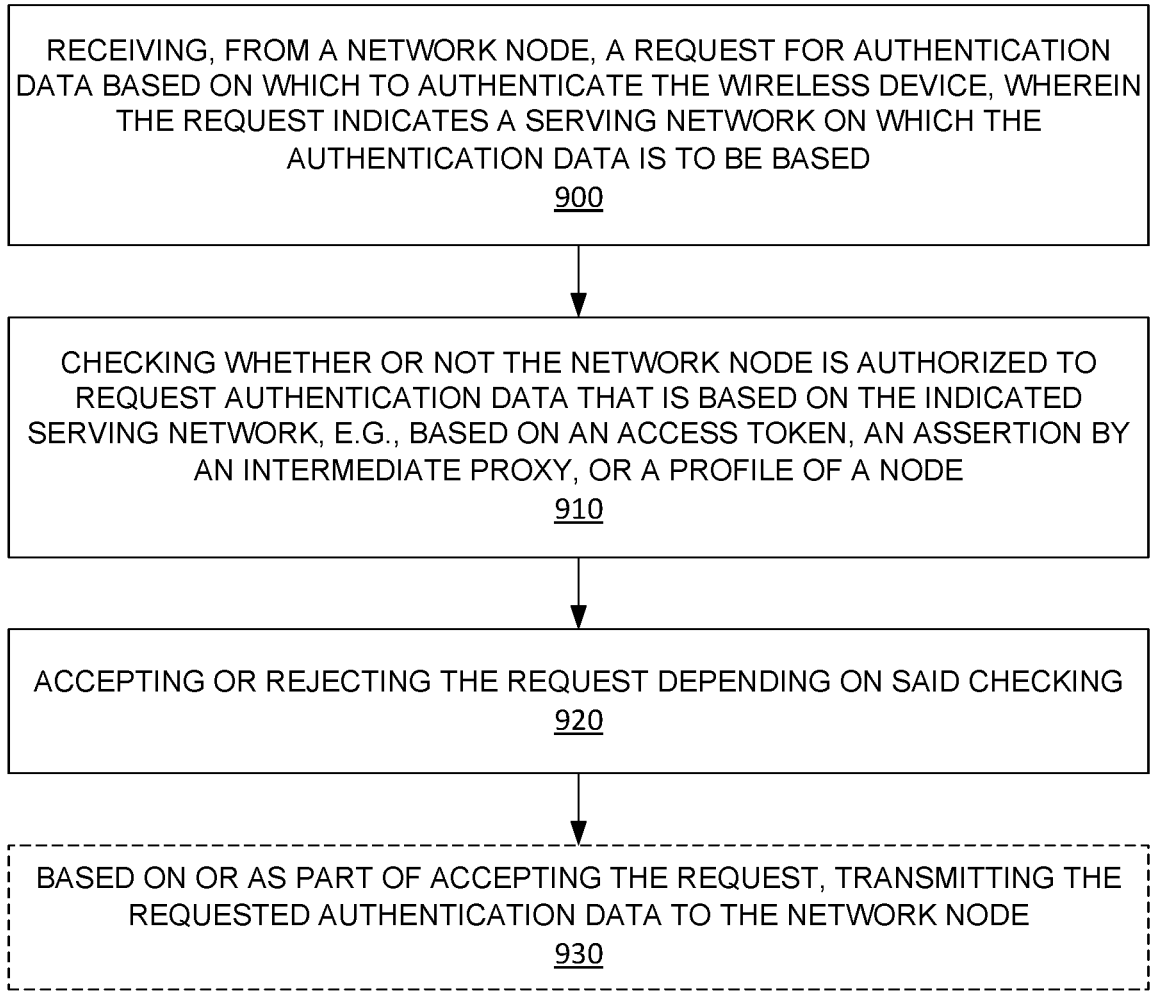
FIG. 9 is a logic flow diagram of a method performed by an authentication server according to some embodiments.

In view of the above modifications and variations, FIG. 9 shows a method performed by an authentication server 16 in a home network 18 of a wireless device 10 according to some embodiments. The method comprises receiving, from a network node 14, a request 20 for authentication data 22 based on which to authenticate the wireless device 10 (Block 900). The request 20 indicates a serving network 12 on which the authentication data 22 is to be based.

The method also comprises checking whether or not the network node 14 is authorized to request authentication data 22 that is based on the indicated serving network 12 (Block 910). In some embodiments, this check is based on supplemental information 12S as described herein. For example, in some embodiments, the check is based on an access token 12S-T that is presented by the network node 14 and that indicates a network of a node to which the access token 12S-T was issued. In other embodiments, the check is based on an assertion by an intermediate proxy 18P indicating a network that is associated with a connection 42 over which the intermediate proxy 18P received the request 20. In yet other embodiments, the check is based on a profile 52 of a node identified by an identity 50 provided by the network node 14, where the profile 52 indicates a network to which the node belongs.

In some embodiments, the method further comprises accepting or rejecting the request 20 depending on said checking (Block 930).

In some embodiments, the method also comprises, based on or as part of accepting the request 20, transmitting the requested authentication data 22 to the network node 14 (Block 940).

Figure 10:
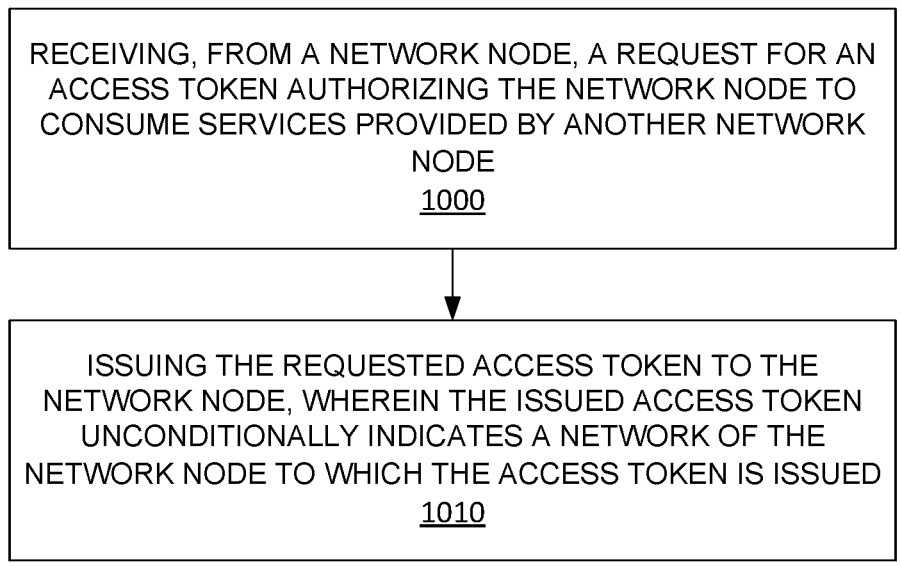
FIG. 10 is a logic flow diagram of a method performed by a network repository according to some embodiments.

FIG. 10 depicts a method performed by a network repository 28 in accordance with other particular embodiments. The method includes receiving, from a network node 14, a request 20 for an access token 12S-T authorizing the network node 14 to consume services provided by another network node (Block 1000). The method also includes issuing the requested access token 12S-T to the network node 14, wherein the issued access token 12S-T unconditionally indicates a network of the network node 14 to which the access token 12S-T is issued (Block 1010).

Figure 11:
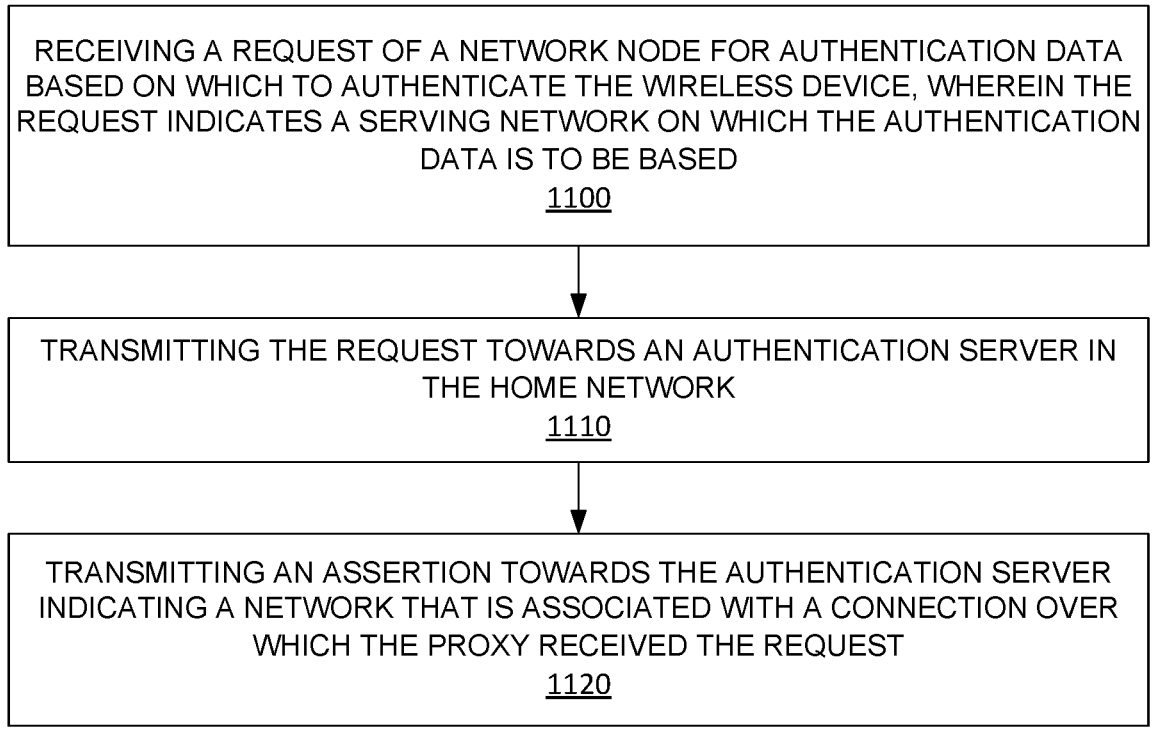
FIG. 11 is a logic flow diagram of a method performed by a proxy according to some embodiments.

FIG. 11 depicts a method performed by a proxy 18P in a home network 18 of a wireless device 10 in accordance with other particular embodiments. The method includes receiving a request 20 of a network node 14 for authentication data 22 based on which to authenticate the wireless device 10, where the request 20 indicates a serving network 12 on which the authentication data 22 is to be based (Block 1100). The method further comprises transmitting the request 20 towards an authentication server 16 in the home network 18 (Block 1110). The method also comprises transmitting an assertion towards the authentication server 16 indicating a network that is associated with a connection 42 over which the proxy received the request 20 (Block 1120). In some embodiments, for example, transmitting the assertion comprises transmitting the assertion in an application-layer header of a message conveying the request 20.

Figure 12:
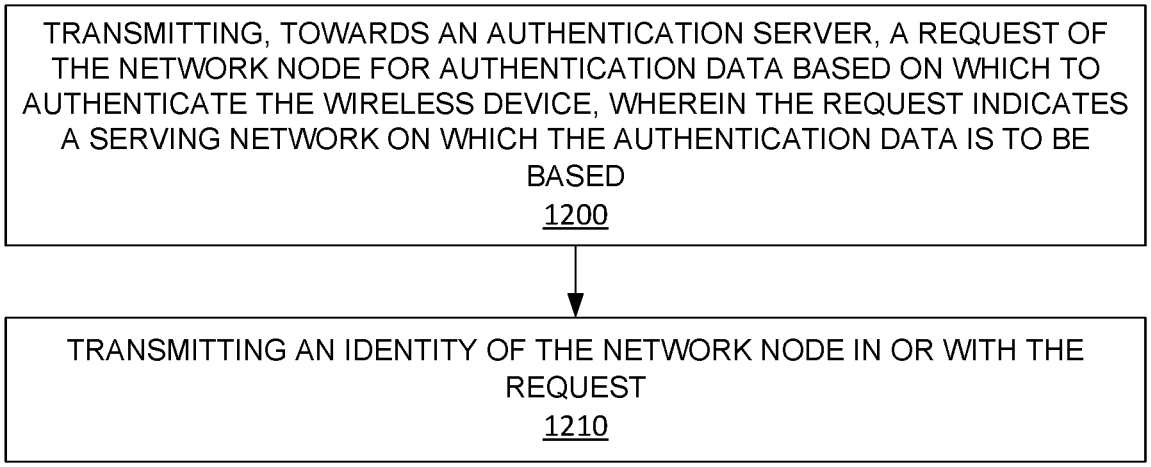
FIG. 12 is a logic flow diagram of a method performed by a network node according to some embodiments.

FIG. 12 illustrates a method performed by a network node 14 in a serving network 12 of a wireless device 10 according to some embodiments. The method comprises transmitting, towards an authentication server 16, a request 20 of the network node 14 for authentication data 22 based on which to authenticate the wireless device 10, where the request 20 indicates a serving network 12 on which the authentication data 22 is to be based (Block 1200). The method also comprises transmitting an identity 50 of the network node 14 in or with the request 20 (Block 1210).

FIG. 13 illustrates still yet another method performed by an authentication server 16 in a home network 18 of a wireless device 10. The method comprises receiving, from a network node 14, a request 20 for authentication data 22 based on which to authenticate the wireless device 10, where the request 20 indicates a serving network 12 on which the authentication data 22 is to be based (Block 1310). The method also comprises, under one or more skip check conditions, refraining from checking whether the network node 14 is authorized to request authentication data 22 that is based on the indicated serving network 12 (Block 1320). For example, in some embodiments, the one or more skip check conditions include the network node 14 belonging to the same network as the authentication server 16 (Block 1330).

Embodiments herein also include corresponding apparatuses. Embodiments herein for instance include an authentication server 16 configured to perform any of the steps of any of the embodiments described above for the authentication server 16.

Embodiments also include an authentication server 16 comprising processing circuitry and power supply circuitry. The processing circuitry is configured to perform any of the steps of any of the embodiments described above for the authentication server 16. The power supply circuitry is configured to supply power to the authentication server 16.

Embodiments further include an authentication server 16 comprising processing circuitry. The processing circuitry is configured to perform any of the steps of any of the embodiments described above for the authentication server 16. In some embodiments, the authentication server 16 further comprises communication circuitry.

Embodiments further include an authentication server 16 comprising processing circuitry and memory. The memory contains instructions executable by the processing circuitry whereby the authentication server 16 is configured to perform any of the steps of any of the embodiments described above for the authentication server 16.

Embodiments herein also include a network repository 28 configured to perform any of the steps of any of the embodiments described above for the network repository 28.

Embodiments also include a network repository 28 comprising processing circuitry and power supply circuitry. The processing circuitry is configured to perform any of the steps of any of the embodiments described above for the network repository 28. The power supply circuitry is configured to supply power to the network repository 28.

Embodiments further include a network repository 28 comprising processing circuitry. The processing circuitry is configured to perform any of the steps of any of the embodiments described above for the network repository 28. In some embodiments, the network repository 28 further comprises communication circuitry.

Embodiments further include a network repository 28 comprising processing circuitry and memory. The memory contains instructions executable by the processing circuitry whereby the network repository 28 is configured to perform any of the steps of any of the embodiments described above for the network repository 28.

Embodiments herein also include a proxy configured to perform any of the steps of any of the embodiments described above for the proxy.

Embodiments also include a proxy comprising processing circuitry and power supply circuitry. The processing circuitry is configured to perform any of the steps of any of the embodiments described above for the proxy. The power supply circuitry is configured to supply power to the proxy.

Embodiments further include a proxy comprising processing circuitry. The processing circuitry is configured to perform any of the steps of any of the embodiments described above for the proxy. In some embodiments, the proxy further comprises communication circuitry.

Embodiments further include a proxy comprising processing circuitry and memory. The memory contains instructions executable by the processing circuitry whereby the proxy is configured to perform any of the steps of any of the embodiments described above for the proxy.

Embodiments herein also include a network node 14 configured to perform any of the steps of any of the embodiments described above for the network node 14.

Embodiments also include a network node 14 comprising processing circuitry and power supply circuitry. The processing circuitry is configured to perform any of the steps of any of the embodiments described above for the network node 14. The power supply circuitry is configured to supply power to the network node 14.

Embodiments further include a network node 14 comprising processing circuitry. The processing circuitry is configured to perform any of the steps of any of the embodiments described above for the network node 14. In some embodiments, the network node 14 further comprises communication circuitry.

Embodiments further include a network node 14 comprising processing circuitry and memory. The memory contains instructions executable by the processing circuitry whereby the network node 14 is configured to perform any of the steps of any of the embodiments described above for the network node 14.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 14:
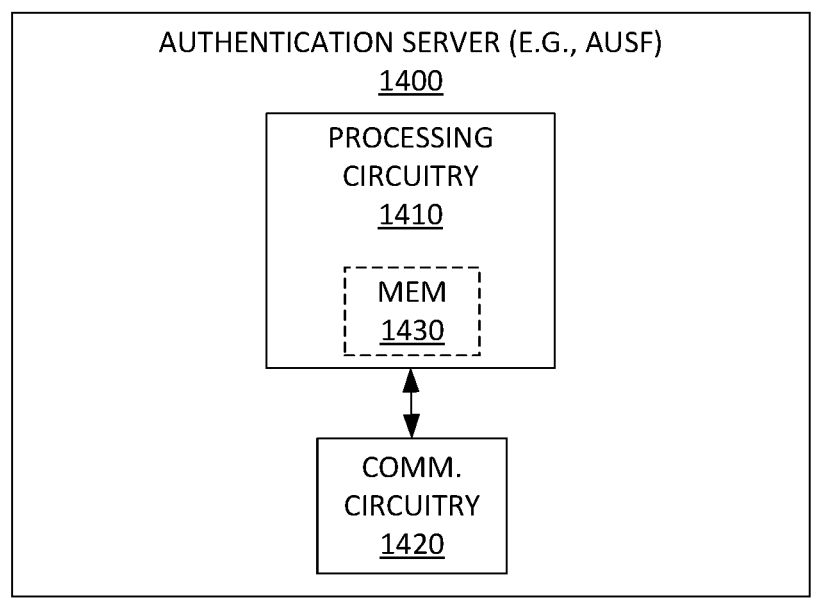
FIG. 14 is a block diagram of an authentication server according to some embodiments.

FIG. 14 for example illustrates an authentication server 1400 (e.g., authentication server 16) configured for use in a home network 18 of a wireless device 10, as implemented in accordance with one or more embodiments. As shown, the authentication server 1400 includes processing circuitry 1410 and communication circuitry 1420. The communication circuitry 1420 is configured to transmit and/or receive information to and/or from one or more other nodes, e.g., via any communication technology. The processing circuitry 1410 is configured to perform processing described above, e.g., in FIG. 9, such as by executing instructions stored in memory 1430. The processing circuitry 1410 in this regard may implement certain functional means, units, or modules.

Figure 15:
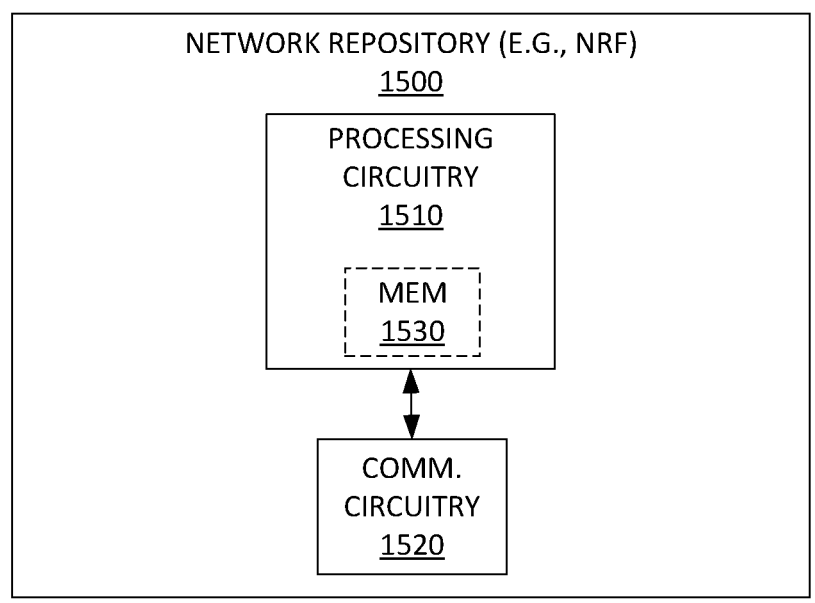
FIG. 15 is a block diagram of a network repository according to some embodiments.

FIG. 15 illustrates a network repository 1500 (e.g., network repository 28) as implemented in accordance with one or more embodiments. As shown, the network repository 1500 includes processing circuitry 1510 and communication circuitry 1520. The communication circuitry 1520 is configured to transmit and/or receive information to and/or from one or more other nodes, e.g., via any communication technology. The processing circuitry 1510 is configured to perform processing described above, e.g., in FIG. 10, such as by executing instructions stored in memory 1530. The processing circuitry 1510 in this regard may implement certain functional means, units, or modules.

Figure 16:
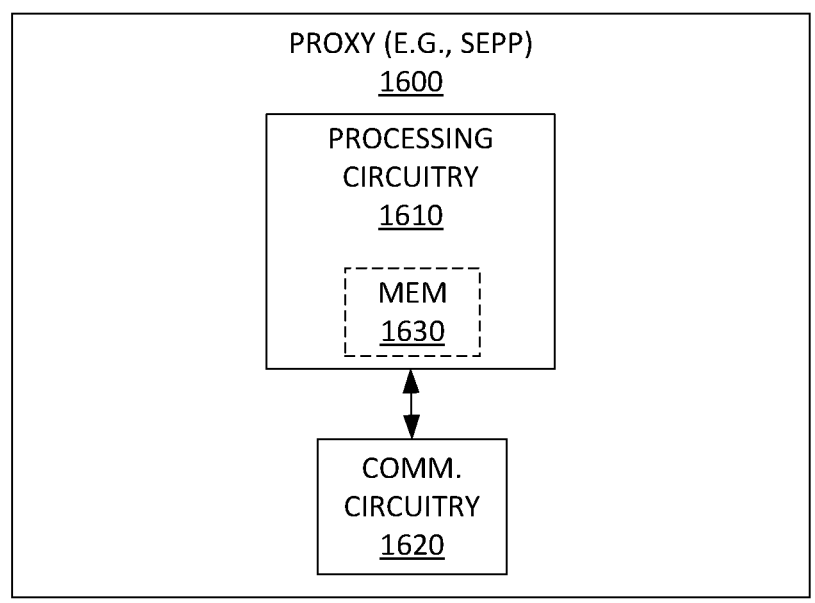
FIG. 16 is a block diagram of a proxy according to some embodiments.

FIG. 16 illustrates a proxy 1600 (e.g., proxy 18P) configured for use in a home network 18 of a wireless device 10, as implemented in accordance with one or more embodiments. As shown, the proxy 1600 includes processing circuitry 1610 and communication circuitry 1620. The communication circuitry 1620 is configured to transmit and/or receive information to and/or from one or more other nodes, e.g., via any communication technology. The processing circuitry 1610 is configured to perform processing described above, e.g., in FIG. 11, such as by executing instructions stored in memory 1630. The processing circuitry 1610 in this regard may implement certain functional means, units, or modules.

Figure 17:
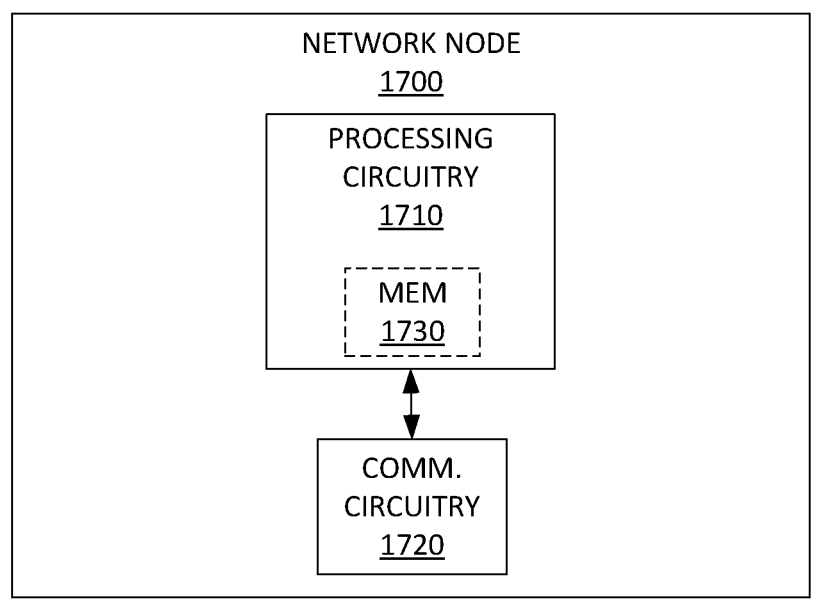
FIG. 17 is a block diagram of a network node according to some embodiments.

FIG. 17 illustrates a network node 1700 (e.g., network node 14) configured for use in a serving network 12 of a wireless device 10, as implemented in accordance with one or more embodiments. As shown, the network node 1700 includes processing circuitry 1710 and communication circuitry 1720. The communication circuitry 1720 is configured to transmit and/or receive information to and/or from one or more other nodes, e.g., via any communication technology. The processing circuitry 1710 is configured to perform processing described above, e.g., in FIG. 12, such as by executing instructions stored in memory 1730. The processing circuitry 1710 in this regard may implement certain functional means, units, or modules.

Figure 18:
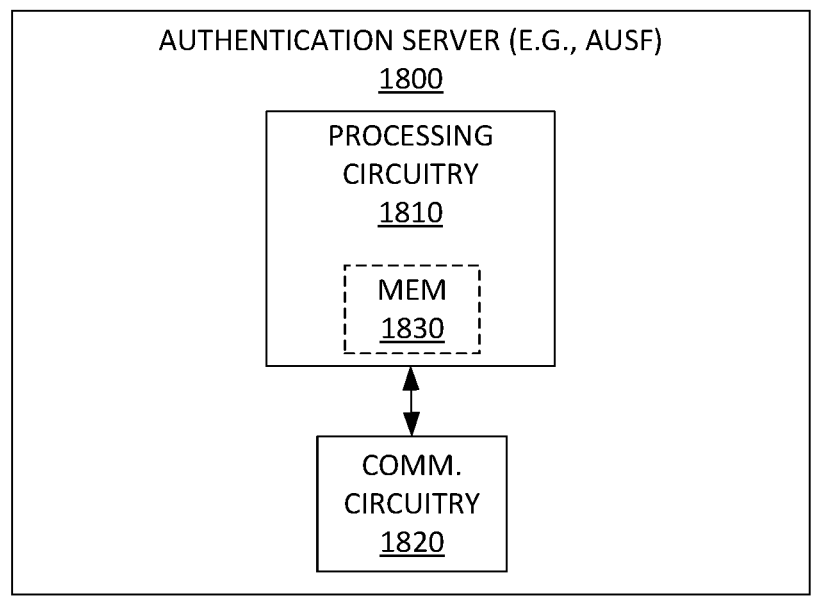
FIG. 18 is a block diagram of an authentication server according to some embodiments.

FIG. 18 illustrates an authentication server 1800 (e.g., authentication server 16) configured for use in a home network 18 of a wireless device 10, as implemented in accordance with one or more other embodiments. As shown, the authentication server 1800 includes processing circuitry 1810 and communication circuitry 1820. The communication circuitry 1820 is configured to transmit and/or receive information to and/or from one or more other nodes, e.g., via any communication technology. The processing circuitry 1810 is configured to perform processing described above, e.g., in FIG. 13, such as by executing instructions stored in memory 1830. The processing circuitry 1810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 19:
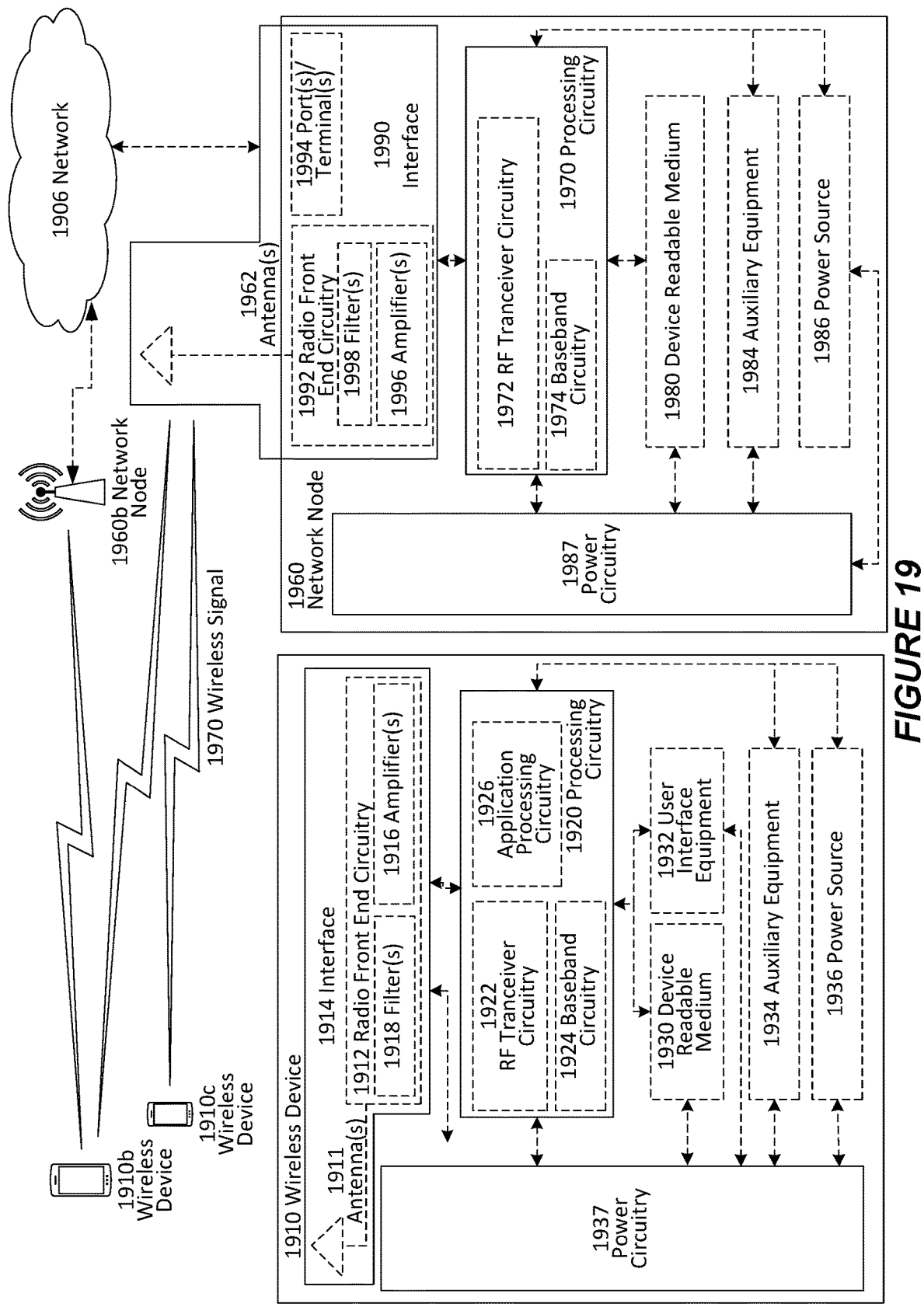
FIG. 19 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960b, and WDs 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LTE, NR, WiFi, or Bluetooth wireless technologies. These wireless technologies may be integrated into the same or different chip or set of chips and other components within network node 1960.

Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source (e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
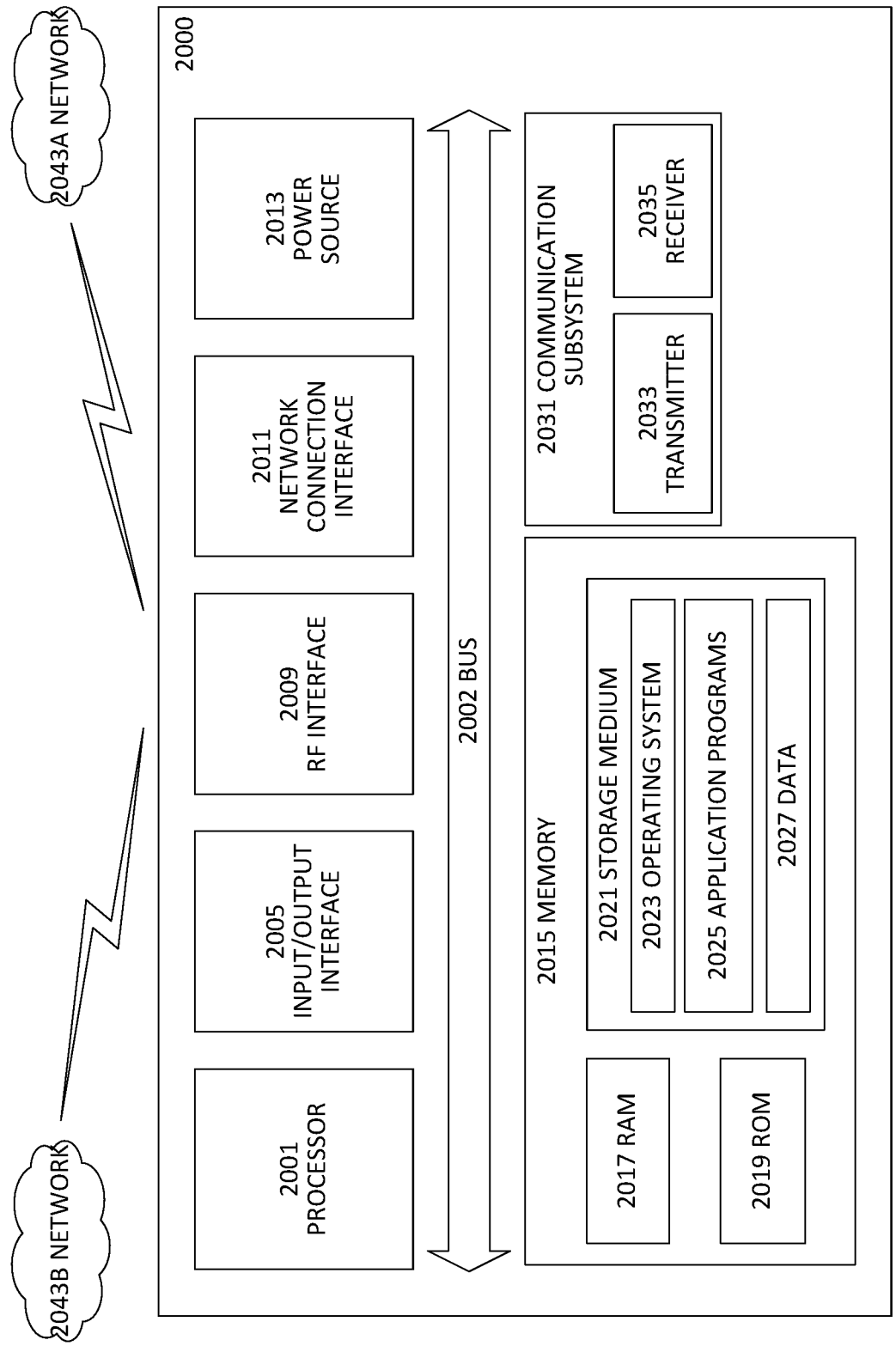
FIG. 20 is a block diagram of a user equipment according to some embodiments.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 20200 may be any UE identified by the 3rd Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 2001 may be configured to process computer instructions and data. Processing circuitry 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043*a*. Network 2043*a* may encompass wired and/or wireless networks such as a local-area network (LAN), a wide-area network (WAN), a computer network, a wireless network, a telecommunications network, another like network or any combination thereof. For example, network 2043*a* may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processing circuitry 2001 to provide storage or caching of data or computer instructions during the execution of software programs such as the operating system, application programs, and device drivers. ROM 2019 may be configured to provide computer instructions or data to processing circuitry 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data file 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processing circuitry 2001 may be configured to communicate with network 2043*b* using communication subsystem 2031. Network 2043*a* and network 2043*b* may be the same network or networks or different network or networks. Communication subsystem 2031 may be configured to include one or more transceivers used to communicate with network 2043*b*. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, UTRAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043*b* may encompass wired and/or wireless networks such as a local-area network (LAN), a wide-area network (WAN), a computer network, a wireless network, a telecommunications network, another like network or any combination thereof. For example, network 2043*b* may be a cellular network, a Wi-Fi network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processing circuitry 2001 may be configured to communicate with any of such components over bus 2002. In another example, any of such components may be represented by program instructions stored in memory that when executed by processing circuitry 2001 perform the corresponding functions described herein. In another example, the functionality of any of such components may be partitioned between processing circuitry 2001 and communication subsystem 2031. In another example, the non-computationally intensive functions of any of such components may be implemented in software or firmware and the computationally intensive functions may be implemented in hardware.

Figure 21:
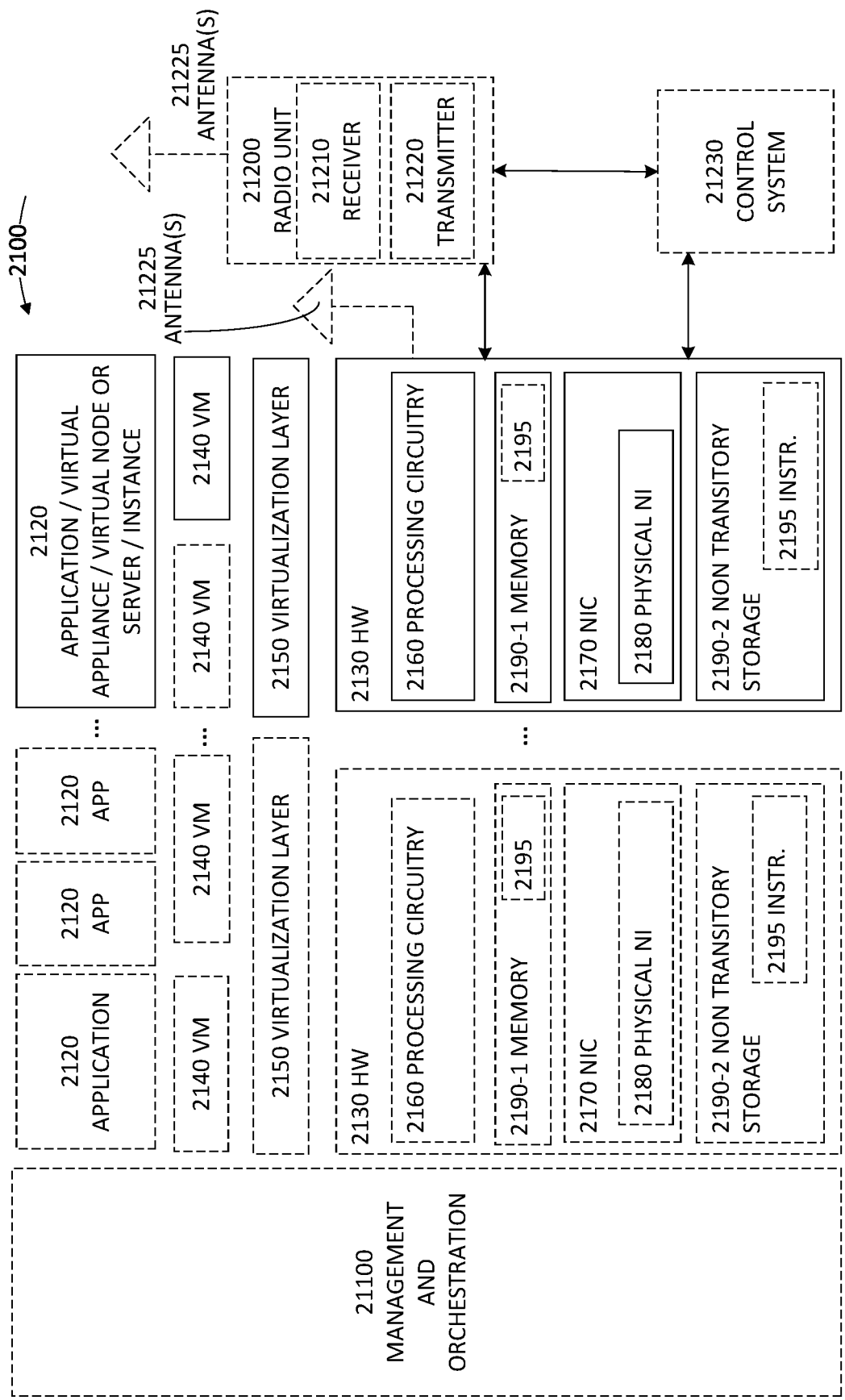
FIG. 21 is a block diagram of a virtualization environment according to some embodiments.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100, comprises general-purpose or special-purpose network hardware devices 2130 comprising a set of one or more processors or processing circuitry 2160, which may be commercial off-the-shelf (COTS) processors, dedicated Application Specific Integrated Circuits (ASICs), or any other type of processing circuitry including digital or analog hardware components or special purpose processors. Each hardware device may comprise memory 2190-1 which may be non-persistent memory for temporarily storing instructions 2195 or software executed by processing circuitry 2160. Each hardware device may comprise one or more network interface controllers (NICs) 2170, also known as network interface cards, which include physical network interface 2180. Each hardware device may also include non-transitory, persistent, machine-readable storage media 2190-2 having stored therein software 2195 and/or instructions executable by processing circuitry 2160. Software 2195 may include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and may be run by a corresponding virtualization layer 2150 or hypervisor. Different embodiments of the instance of virtual appliance 2120 may be implemented on one or more of virtual machines 2140, and the implementations may be made in different ways.

During operation, processing circuitry 2160 executes software 2195 to instantiate the hypervisor or virtualization layer 2150, which may sometimes be referred to as a virtual machine monitor (VMM). Virtualization layer 2150 may present a virtual operating platform that appears like networking hardware to virtual machine 2140.

As shown in FIG. 21, hardware 2130 may be a standalone network node with generic or specific components. Hardware 2130 may comprise antenna 21225 and may implement some functions via virtualization. Alternatively, hardware 2130 may be part of a larger cluster of hardware (e.g. such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2140 may be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 may be coupled to one or more antennas 21225. Radio units 21200 may communicate directly with hardware nodes 2130 via one or more appropriate network interfaces and may be used in combination with the virtual components to provide a virtual node with radio capabilities, such as a radio access node or a base station.

In some embodiments, some signalling can be effected with the use of control system 21230 which may alternatively be used for communication between the hardware nodes 2130 and radio units 21200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the present disclosure will come to mind to one skilled in the art having the benefit of the teachings presented in the foregoing descriptions and the associated drawings. Therefore, it is to be understood that the present disclosure not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by an authentication server in a home network of a wireless device, the method comprising:
   receiving, from a network node, a request for authentication data based on which to authenticate the wireless device, wherein the request indicates a serving network on which the authentication data is to be based;
   checking whether or not the network node is authorized to request authentication data that is based on the indicated serving network, wherein said checking is based on an assertion by an intermediate proxy indicating a network that is associated with a connection over which the intermediate proxy received the request; and
   accepting or rejecting the request depending on said checking.

2. The method of claim 1, wherein the request includes a serving network name that indicates the serving network on which the authentication data is to be based, and wherein said checking comprises:
   forming an expected serving network name based on the assertion; and
   comparing the serving network name included in the request with the expected serving network name.

3. The method of claim 1, wherein the assertion includes a public land mobile network identity, wherein the request includes a serving network name that indicates the serving network on which the authentication data is to be based, and wherein said checking comprises:
   comparing the serving network name included the request with an expected serving network name formed from the public land mobile network identity; or
   comparing a public land mobile network identity extracted from the serving network name included in the request with the public land mobile network identity.

4. The method of claim 1, further comprising receiving the assertion in or with the request.

5. The method of claim 1, wherein the intermediate proxy is in the home network, wherein the connection is Transport Layer Security (TLS) connection between the intermediate proxy in the home network and another intermediate proxy in a visited network from which the request was received, and wherein the network associated with the connection is associated with a context for the TLS connection.

6. The method of claim 1, wherein the authentication server implements an Authentication Server Function (AUSF), and wherein the network node implements an Access and Mobility Function (AMF) or a Security Anchor Function (SEAF) within an AMF instance.

7. The method of claim 1, wherein the intermediate proxy is a Security Edge Protection Proxy (SEPP).

8. The method of claim 1, further comprising, based on or as part of accepting the request, transmitting the requested authentication data to the network node.

9. A method performed by a proxy in a home network of a wireless device, the method comprising:
   receiving, from a network node, a request for authentication data based on which to authenticate the wireless device, wherein the request indicates a serving network on which the authentication data is to be based;
   transmitting the request towards an authentication server that is in the home network and that is to accept or reject the request; and
   transmitting, towards the authentication server, an assertion based on which the authentication server is to perform a check of whether or not the network node is authorized to request authentication data that is based on the indicated serving network, with acceptance or rejection of the request depending on said check, wherein the assertion indicates a network that is associated with a connection over which the proxy received the request.

10. The method of claim 9, wherein the connection is Transport Layer Security (TLS) connection, and wherein the network that is associated with the connection is associated with a context for the TLS connection.

11. The method of claim 9, wherein transmitting the assertion comprises transmitting the assertion in an application-layer header of a message conveying the request.

12. The method of claim 9, wherein the proxy is a Security Edge Protection Proxy (SEPP), and wherein the authentication server implements an Authentication Server Function (AUSF).

13. The method of claim 9, further comprising receiving the assertion in or with the request and verifying the assertion, and wherein transmitting the assertion is performed based on verification of the assertion being successful.

14. An authentication server configured for use in a home network of a wireless device, the authentication server comprising:

communication circuitry; and processing circuitry configured to:
- receive, from a network node, a request for authentication data based on which to authenticate the wireless device, wherein the request indicates a serving network on which the authentication data is to be based;
- perform a check of whether or not the network node is authorized to request authentication data that is based on the indicated serving network, wherein said check is based on an assertion by an intermediate proxy indicating a network that is associated with a connection over which the intermediate proxy received the request; and
- accept or reject the request depending on said check.

15. The authentication server of claim 14, wherein the request includes a serving network name that indicates the serving network on which the authentication data is to be based, and wherein the processing circuitry is configured to perform said check by:
- forming an expected serving network name based on the assertion; and
- comparing the serving network name included in the request with the expected serving network name.

16. The authentication server of claim 14, wherein the assertion includes a public land mobile network identity, wherein the request includes a serving network name that indicates the serving network on which the authentication data is to be based, and wherein the processing circuitry is configured to perform said check by:
- comparing the serving network name included the request with an expected serving network name formed from the public land mobile network identity; or
- comparing a public land mobile network identity extracted from the serving network name included in the request with the public land mobile network identity.

17. The authentication server of claim 14, wherein the processing circuitry is configured to receive the assertion in or with the request.

18. The authentication server of claim 14, wherein the intermediate proxy is in the home network, wherein the connection is Transport Layer Security (TLS) connection between the intermediate proxy in the home network and another intermediate proxy in a visited network from which the request was received, and wherein the network associated with the connection is associated with a context for the TLS connection.

19. A proxy configured for use in a home network of a wireless device, the proxy comprising:

communication circuitry; and processing circuitry configured to:
- receive, from a network node, a request for authentication data based on which to authenticate the wireless device, wherein the request indicates a serving network on which the authentication data is to be based;
- transmit the request towards an authentication server that is in the home network and that is to accept or reject the request; and
- transmit, towards the authentication server, an assertion based on which the authentication server is to perform a check of whether or not the network node is authorized to request authentication data that is based on the indicated serving network, with acceptance or rejection of the request depending on said check, wherein the assertion indicates a network that is associated with a connection over which the proxy received the request.

20. The proxy of claim 19, wherein the processing circuitry is further configured to receive the assertion in or with the request and to verify the assertion, wherein the processing circuitry is configured to transmit the assertion based on verification of the assertion being successful.

* * * * *